US012555511B2

(12) United States Patent
Shang et al.

(10) Patent No.: US 12,555,511 B2
(45) **Date of Patent: *Feb. 17, 2026**

(54) GATE DRIVING UNIT, DRIVING METHOD, GATE DRIVING CIRCUIT, AND DISPLAY APPARATUS

(71) Applicant: BOE TECHNOLOGY GROUP CO., LTD., Beijing (CN)

(72) Inventors: Guangliang Shang, Beijing (CN); Jie Zhang, Beijing (CN); Jiangnan Lu, Beijing (CN); Mei Li, Beijing (CN); Libin Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/938,202

(22) Filed: Nov. 5, 2024

(65) Prior Publication Data

US 2025/0061835 A1 Feb. 20, 2025

Related U.S. Application Data

(63) Continuation of application No. 18/466,619, filed on Sep. 13, 2023, now Pat. No. 12,183,256, which is a (Continued)

(30) Foreign Application Priority Data

Sep. 2, 2020 (CN) ......................... 202010908595.6

(51) Int. Cl.
*G09G 3/3266* (2016.01)
*G09G 3/20* (2006.01)
*G09G 3/36* (2006.01)

(52) U.S. Cl.
CPC ... *G09G 3/2092* (2013.01); *G09G 2300/0426* (2013.01); *G09G 2300/0842* (2013.01);
(Continued)

(58) Field of Classification Search
CPC ........................... G09G 3/3266; G09G 3/3677
See application file for complete search history.

(56) References Cited

U.S. PATENT DOCUMENTS 6,184,741 B1 * 2/2001 Ghilardelli ............. G11C 5/145
363/63
10,553,163 B2 * 2/2020 Chung ................ G09G 3/3266
(Continued)

*Primary Examiner* — Sepehr Azari
(74) *Attorney, Agent, or Firm* — McCoy Russell LLP

(57) ABSTRACT

A gate driving unit includes a charge pump circuit and an output circuit; the charge pump circuit is connected to a first input node, an input clock signal terminal and a first node; the charge pump circuit is configured to control a voltage signal of the first input node under the control of an input clock signal provided by the input clock signal terminal, the voltage signal of the first input node is written into the first node when the voltage signal of the first input node is a first voltage signal; the output circuit comprises a first output transistor, a control electrode of the first output transistor is connected to the first node, a first electrode of the first output transistor is connected to an output voltage terminal, and a second electrode of the first output transistor is connected to a gate driving signal output terminal.

20 Claims, 19 Drawing Sheets

Related U.S. Application Data continuation of application No. 17/905,620, filed as application No. PCT/CN2021/112322 on Aug. 12, 2021, now Pat. No. 11,798,458.

(52) U.S. Cl.
CPC ............... *G09G 2310/0267* (2013.01); *G09G 2330/021* (2013.01)

(56) References Cited

U.S. PATENT DOCUMENTS

| | | | | |
|---|---|---|---|---|
| 2006/0187177 | A1* | 8/2006 | Kuo | G11C 19/28<br>345/100 |
| 2009/0086116 | A1* | 4/2009 | Pak | G09G 3/3677<br>349/38 |
| 2011/0115834 | A1* | 5/2011 | Han | H02M 3/073<br>327/536 |
| 2015/0356909 | A1* | 12/2015 | Lim | G09G 3/3677<br>327/109 |
| 2016/0189584 | A1* | 6/2016 | Xiao | G09G 3/3677<br>345/55 |
| 2016/0343334 | A1* | 11/2016 | Hao | G09G 3/3677 |
| 2017/0063369 | A1* | 3/2017 | Boakye | H03K 17/0822 |
| 2019/0057667 | A1* | 2/2019 | Pyun | G09G 3/3688 |
| 2019/0180708 | A1* | 6/2019 | Hong | G06F 3/0412 |
| 2020/0005696 | A1* | 1/2020 | Liao | H10D 86/60 |
| 2020/0380911 | A1* | 12/2020 | Park | G09G 3/3266 |
| 2020/0402437 | A1* | 12/2020 | Lin | H03K 3/35613 |
| 2021/0090484 | A1* | 3/2021 | Shang | G09G 3/3266 |
| 2021/0201807 | A1* | 7/2021 | Feng | G09G 3/3266 |
| 2021/0366402 | A1* | 11/2021 | In | G09G 3/3266 |
| 2022/0036802 | A1* | 2/2022 | Kim | G09G 3/3266 |
| 2022/0199030 | A1* | 6/2022 | In | G09G 3/3241 |
| 2022/0406261 | A1* | 12/2022 | Zhai | G11C 19/28 |
| 2023/0140411 | A1* | 5/2023 | Shang | G09G 3/2092<br>345/55 |
| 2024/0321215 | A1* | 9/2024 | Kim | G09G 3/3233 |

* cited by examiner

GATE DRIVING UNIT, DRIVING METHOD, GATE DRIVING CIRCUIT, AND DISPLAY APPARATUS

CROSS-REFERENCE TO RELATED APPLICATIONS

The present application is a continuation of U.S. Non-Provisional application Ser. No. 18/466,619 entitled "GATE DRIVING UNIT, DRIVING METHOD, GATE DRIVING CIRCUIT AND DISPLAY DEVICE", and filed on Sep. 13, 2023. U.S. Non-Provisional application Ser. No. 18/466,619 is a continuation of U.S. Non-Provisional application Ser. No. 17/905,620, entitled "GATE DRIVING UNIT, DRIVING METHOD, GATE DRIVING CIRCUIT AND DISPLAY DEVICE", and filed on Sep. 2, 2022. U.S. Non-Provisional application Ser. No. 17/905,620 is a U.S. National Phase of International Application No. PCT/CN2021/112322 filed on Aug. 12, 2021. International Application No. PCT/CN2021/112322 claims priority to Chinese Patent Application No. 202010908595.6 filed on Sep. 2, 2020. The entire contents of each of the above-listed applications are hereby incorporated by reference for all purposes.

TECHNICAL FIELD

The present disclosure relates to the field of display technology, and more particularly to a gate driving unit, a driving method, a gate driving circuit and a display device.

BACKGROUND

In order to keep the brightness fluctuation of pixels within a reasonable range, the data still needs to be refreshed for a still picture, because the voltage that controls the brightness changes over time due to leakage. In order to reduce power consumption, reducing the refresh frequency is a more effective method. At the same time, it is necessary to maintain the display quality, and it is necessary to reduce the leakage speed of pixels. Oxide semiconductors have ultra-low leakage characteristics to meet this demand. In order to ensure the charging speed of the pixel and small parasitic capacitance, it is beneficial to combine the Low Temperature Polycrystalline Oxide (LTPO) process. When the existing gate driving unit is in operation, the potential of the gate driving signal cannot be prevented from being affected by noise interference in a maintenance phase.

SUMMARY

A first aspect of the present disclosure provides a gate driving unit, including a first input node control circuit and a charge pump circuit, the first input node control circuit is electrically connected to a clock signal terminal, an input terminal and a first input node respectively, and is configured to connect or disconnect the input terminal and the first input node under the control of a clock signal provided by the clock signal terminal; the charge pump circuit is electrically connected to the first input node, an input clock signal terminal and a first node respectively, and is configured to control to convert a voltage signal of the first input node into a voltage signal of the first node under the control of an input clock signal provided by the input clock signal terminal when the voltage signal of the first input node is a first voltage signal, so that a polarity of the voltage signal of the first node is the same as a polarity of the voltage signal of the first input node, and an absolute value of a voltage value of the voltage signal of the first node is greater than an absolute value of a voltage value of the voltage signal of the first input node.

Optionally, the gate driving unit comprises an output circuit, the output circuit includes a first output transistor, a control electrode of the first output transistor is electrically connected to the first node, and a first electrode of the first output transistor is electrically connected to an output voltage terminal, and a second electrode of the first output transistor is electrically connected to a gate driving signal output terminal.

Optionally, the charge pump circuit includes an input energy storage sub-circuit, an on-off control sub-circuit and a first energy storage sub-circuit; a first end of the input energy storage sub-circuit is electrically connected to the input clock signal terminal, and a second end of the input energy storage sub-circuit is electrically connected to the first input node, the input energy storage sub-circuit is configured to store electrical energy and control a potential of the first input node according to a potential of the input clock signal; the on-off control sub-circuit is electrically connected to the first input node and the first node respectively, and is configured to connect to disconnect the first input node and the first node under the control of the potential of the first input node; the first energy storage sub-circuit is electrically connected to the first node and configured to store electrical energy and maintain the potential of the first node.

Optionally, the charge pump circuit includes an input energy storage sub-circuit, an on-off control sub-circuit, a switch control sub-circuit and a first energy storage sub-circuit; a first end of the input energy storage sub-circuit is electrically connected to the first control node, and a second end of the input energy storage sub-circuit is electrically connected to the first input node, the input energy storage sub-circuit is configured to store electrical energy and control a potential of the first input node according to a potential of the first control node; the on-off control sub-circuit is electrically connected to the first input node and the first node respectively, and is configured to connect or disconnect the first input node and the first node under the control of the potential of the first input node; the first energy storage sub-circuit is electrically connected to the first node and is configured to store electrical energy and maintain the potential of the first node; the switch control sub-circuit is electrically connected to the first input node, the input clock signal terminal and the first control node, respectively, and is configured to connect to disconnect the input clock signal terminal and the first control node under the control of the potential of the first input node.

Optionally, the input energy storage sub-circuit includes an input capacitor, the first energy storage sub-circuit includes a first storage capacitor, and the on-off control sub-circuit includes an on-off control transistor; a first end of the input capacitor is electrically connected to the input clock signal terminal, and a second end of the input capacitor is electrically connected to the first input node; a first end of the first storage capacitor is electrically connected to the first node, and a second end of the first storage capacitor is electrically connected to a second voltage terminal; a control electrode of the on-off control transistor and a first electrode of the on-off control transistor are electrically connected to the first input node, and a second electrode of the on-off control transistor is electrically connected to the first node.

Optionally, the input energy storage sub-circuit includes an input capacitor, the first energy storage sub-circuit includes a first storage capacitor, and the on-off control sub-circuit includes an on-off control transistor; a first end of the input capacitor is electrically connected to the first control node, and a second end of the input capacitor is electrically connected to the first input node; a first end of the first storage capacitor is electrically connected to the first node, and a second end of the first storage capacitor is electrically connected to a second voltage terminal; a control electrode of the on-off control transistor and a first electrode of the on-off control transistor are electrically connected to the first input node, and a second electrode of the on-off control transistor is electrically connected to the first node.

Optionally, a ratio between a capacitance value of the input capacitor and a capacitance value of the first storage capacitor is greater than or equal to 1 and less than or equal to 10.

Optionally, the switch control sub-circuit comprises a switch control transistor; a control electrode of the switch control transistor is electrically connected to the first input node, a first electrode of the switch control transistor is electrically connected to the input clock signal terminal, and a second electrode of the switch control transistor is electrically connected to the first control node.

Optionally, the first input node control circuit comprises a first isolation node control sub-circuit and a first isolation sub-circuit; the first isolation node control sub-circuit is electrically connected to the clock signal terminal, the input terminal and a first isolation node respectively, and is configured to connect or disconnect the input terminal and the first isolation node under the control of the clock signal provided by the clock signal terminal; the first isolation sub-circuit is electrically connected to a second voltage terminal, the first isolation node and the first input node respectively, and is configured to connect the first isolation node and the first input node under the control of a second voltage signal provided by the second voltage terminal.

Optionally, the clock signal terminal includes a first clock signal terminal and a second clock signal terminal; the first isolation node control sub-circuit includes a first control transistor and a second control transistor; a control electrode of the first control transistor is electrically connected to the second clock signal terminal, a first electrode of the first control transistor is electrically connected to the input terminal, and a control electrode of the second control transistor is electrically connected to the first clock signal terminal, a first electrode of the second control transistor is electrically connected to a second electrode of the first control transistor, and a second electrode of the second control transistor is electrically connected to the first isolation node; or the clock signal terminal includes the second clock signal terminal, and the first isolation node control sub-circuit includes the first control transistor; the control electrode of the first control transistor is electrically connected to the second clock signal terminal, the first electrode of the first control transistor is electrically connected to the input terminal, and the second electrode of the first control transistor is electrically connected to the first isolation node; or the clock signal terminal includes the first clock signal terminal, and the first isolation node control sub-circuit includes the second control transistor; the control electrode of the second control transistor is connected to the first clock signal terminal, the first electrode of the second control transistor is electrically connected to the input terminal, and the second electrode of the second control transistor is electrically connected to the first isolation node.

Optionally, the first isolation sub-circuit comprises a first isolation transistor; a control electrode of the first isolation transistor is electrically connected to the second voltage terminal, a first electrode of the first isolation transistor is electrically connected to the first isolation node, and a second electrode of the first isolation transistor is electrically connected to the first input node.

Optionally, the gate driving unit further includes a first node control circuit; the first node control circuit is electrically connected to a second input node, a third voltage terminal and the first node, respectively, and is configured to write a third voltage signal inputted by the third voltage terminal into the first node under the control of a potential of the second input node.

Optionally, the first node control circuit comprises a first node control transistor; a control electrode of the first node control transistor is electrically connected to the second input node, a first electrode of the first node control transistor is electrically connected to the third voltage terminal, and a second electrode of the first node control transistor is electrically connected to the first node.

Optionally, the gate driving unit further includes a first energy storage circuit; the first energy storage circuit is electrically connected to the second node and the second clock signal terminal respectively, and is configured to control a potential of the second node based on the second clock signal.

Optionally, the gate driving unit further includes a gate driving signal output terminal and a first energy storage circuit; the first energy storage circuit is electrically connected to a second node and the gate driving signal output terminal respectively, and is configured to control a potential of the second node according to a gate driving signal outputted by the gate driving signal output terminal.

Optionally, the gate driving unit further includes an output circuit; the output circuit is respectively electrically connected to the first node, a second node, a gate driving signal output terminal, an output voltage terminal and a second clock signal output terminal, and is configured to write an output voltage signal into the gate driving signal output terminal under the control of the potential of the first node, and control to write a second clock signal into the gate driving signal output terminal under the control of a potential of the second node; the output voltage terminal is used for providing the output voltage signal.

Optionally, the output circuit comprises a first output transistor and a second output transistor; a control electrode of the first output transistor is electrically connected to the first node, a first electrode of the first output transistor is electrically connected to the output voltage terminal, and a second electrode of the first output transistor is electrically connected to the gate driving signal output terminal; a control electrode of the second output transistor is electrically connected to the second node, a first electrode of the second output transistor is electrically connected to the gate driving signal output terminal, and a second electrode of the second output transistor is electrically connected to the second clock signal terminal.

Optionally, the gate driving unit further includes a second node control circuit; the second node control circuit includes a third input node control sub-circuit, a second input node control sub-circuit and a second node control sub-circuit; the third input node control sub-circuit is respectively electrically connected to a first clock signal terminal, a second voltage terminal, the first input node and a third input node, and is configured to write a second voltage signal into the third input node under the control of a first clock signal, and control to write the first clock signal into the third input node under the control of the potential of the first input node; the second input node control sub-circuit is respectively electrically connected to the third input node, a second input node and the input clock signal terminal, and is configured to write the input clock signal into the second input node under the control of a potential of the third input node, and control a potential of the second input node according to the potential of the third input node; the second node control sub-circuit is respectively electrically connected to the second input node, the first input node, the second node and the input clock signal terminal, and the second node control sub-circuit is further connected to a second clock signal terminal or a third voltage terminal, is configured to connect or disconnect the second input node and the second node under the control of the input clock signal, and write a second clock signal or a third voltage signal into the second node under the control of the potential of the first input node.

Optionally, the third input node control sub-circuit comprises a third control transistor and a fourth control transistor, a control electrode of the third control transistor is electrically connected to the first clock signal terminal, a first electrode of the third control transistor is electrically connected to the second voltage terminal, and a second electrode of the third control transistor is electrically connected to the third input node; a control electrode of the fourth control transistor is electrically connected to the first input node, a first electrode of the fourth control transistor is electrically connected to the first clock signal terminal, and a second electrode of the fourth control transistor is electrically connected to the third input node.

Optionally, the gate driving unit further includes a second node control circuit; the second node control circuit includes a third input node control sub-circuit, a second input node control sub-circuit and a second node control sub-circuit; the third input node control sub-circuit is respectively electrically connected to the first clock signal terminal, the second voltage terminal, the first isolation node and the third input node, and is configured to write the second voltage signal into the third input node under the control of the first clock signal, and write the first clock signal into the third input node under the control of the potential of the first isolation node; the second input node control sub-circuit is respectively electrically connected to the third input node, the second input node and the input clock signal terminal, and is configured to write the input clock signal into the second input node under the control of the potential of the third input node, and control the potential of the second input node according to the potential of the third input node; the second node control sub-circuit is respectively electrically connected to the second input node, the first isolation node, the second node and the input clock signal terminal, and the second node control sub-circuit is further connected to the second clock signal terminal or the third voltage terminal, and is configured to connect or disconnect the second input node and the second node under the control of the input clock signal, and write the second clock signal or the third voltage signal into the second node under the control of the potential of the first input node.

Optionally, the third input node control sub-circuit comprises a third control transistor and a fourth control transistor, a control electrode of the third control transistor is electrically connected to the first clock signal terminal, a first electrode of the third control transistor is electrically connected to the second voltage terminal, and a second electrode of the third control transistor is electrically connected to the third input node; a control electrode of the fourth control transistor is electrically connected to the first isolation node, a first electrode of the fourth control transistor is electrically connected to the first clock signal terminal, and a second electrode of the fourth control transistor is electrically connected is electrically connected to the third input node.

Optionally, the third input node control sub-circuit comprises a third control transistor, a fourth control transistor and a second isolation transistor; a control electrode of the third control transistor is electrically connected to the first clock signal terminal, a first electrode of the third control transistor is electrically connected to the second voltage terminal, and a second electrode of the third control transistor is electrically connected to the second isolation node; a control electrode of the fourth control transistor is electrically connected to the first isolation node, a first electrode of the fourth control transistor is electrically connected to the first clock signal terminal, and a second electrode of the fourth control transistor is electrically connected electrically connected to the second isolation node; a control electrode of the second isolation transistor is electrically connected to the second voltage terminal, a first electrode of the second isolation transistor is electrically connected to the second isolation node, and a second electrode of the second isolation transistor is electrically connected to the third input node.

Optionally, the second input node control sub-circuit comprises a fifth control transistor and a first capacitor; a control electrode of the fifth control transistor is electrically connected to the third input node, a first electrode of the fifth control transistor is electrically connected to the second input node, and a second electrode of the fifth control transistor is electrically connected to the input clock signal terminal; a first end of the first capacitor is electrically connected to the third input node, and a second end of the first capacitor is electrically connected to the second input node.

Optionally, the second node control sub-circuit comprises a sixth control transistor and a seventh control transistor; a control electrode of the sixth control transistor is electrically connected to the input clock signal terminal, a first electrode of the sixth control transistor is electrically connected to the second input node, and a second electrode of the sixth control transistor is electrically connected to the second node; a control electrode of the seventh control transistor is electrically connected to the first isolation node, a first electrode of the seventh control transistor is electrically connected to the second clock signal terminal or the third voltage terminal, and a second electrode the seventh control transistor is electrically connected to the second node.

In a second aspect, an embodiment of the present disclosure provides a driving method applied to the gate driving unit and including: connecting or disconnect, by the first input node control circuit, the input terminal and the first input node under the control of the clock signal provided by the clock signal terminal; when the voltage signal of the first input node is a first voltage signal, controlling, by the charge pump circuit, to convert the voltage signal of the first input node into the voltage signal of the first node under the control of the input clock signal provided by the input clock signal terminal, so that the polarity of the voltage signal of the first node is the same as the polarity of the voltage signal of the first input node, and the absolute value of the voltage value of the voltage signal of the first node is greater than the absolute value of the voltage value of the voltage signal of the first input node.

In a third aspect, an embodiment of the present disclosure provides a gate driving circuit including the gate driving unit.

In a fourth aspect, an embodiment of the present disclosure provides a display device including the gate driving circuit.

DETAILED DESCRIPTION

The technical solutions in the embodiments of the present disclosure will be clearly and completely described below with reference to the accompanying drawings in the embodiments of the present disclosure. Obviously, the described embodiments are only a part of the embodiments of the present disclosure, but not all of the embodiments. Based on the embodiments in the present disclosure, all other embodiments obtained by those of ordinary skill in the art without creative efforts shall fall within the protection scope of the present disclosure.

The transistors used in all the embodiments of the present disclosure may be triodes, thin film transistors, field effect transistors, or other devices with the same characteristics. In the embodiments of the present disclosure, in order to distinguish the two electrodes of the transistor except the control electrode, one electrode is called the first electrode, and the other electrode is called the second electrode.

In actual operation, when the transistor is a triode, the control electrode may be the base, the first electrode may be the collector, and the second electrode may be the emitter; or the control electrode may be the base, the first electrode can be an emitter, and the second electrode can be a collector.

In actual operation, when the transistor is a thin film transistor or a field effect transistor, the control electrode may be a gate electrode, the first electrode may be a drain electrode, and the second electrode may be a source electrode; or the control electrode may be a gate electrode, the first electrode may be a source electrode, and the second electrode may be a drain electrode.

Figure 1:
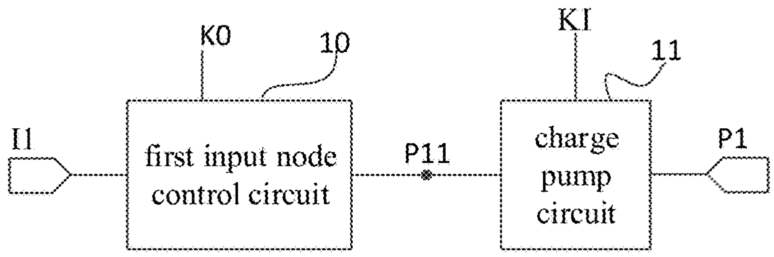
FIG. 1 is a structural diagram of a gate driving unit according to an embodiment of the present disclosure.

As shown in FIG. 1, the gate driving unit according to the embodiment of the present disclosure includes a first input node control circuit 10 and a charge pump circuit 11;

The first input node control circuit 10 is electrically connected to a clock signal terminal K0, an input terminal I1 and a first input node P11 respectively, and is configured to connect or disconnect the input terminal I1 and the first input node P11 under the control of a clock signal provided by the clock signal terminal K0;

The charge pump circuit 11 is electrically connected to the first input node P11, an input clock signal terminal KI and a first node P1 respectively, and is configured to control to convert a voltage signal of the first input node P11 into a voltage signal of the first node P1 under the control of an input clock signal provided by the input clock signal terminal KI when the voltage signal of the first input node P11 is a first voltage signal, and control a polarity of the voltage signal of the first node P1 to be the same as a polarity of the voltage signal of the first input node P11, and an absolute value of a voltage value of the voltage signal of the first node P1 is greater than an absolute value of a voltage value of the voltage signal of the first input node P11.

The gate driving unit according to the embodiment of the present disclosure can sufficiently pull down or pull up the potential of the first node P1 in the maintenance phase through the charge pump circuit 11, so that in the maintenance phase, the first output transistor controlled by P1 is turned on, and the potential of the gate driving signal is not be affected by noise interference.

The polarity of the voltage signal of the first node P1 is the same as the polarity of the voltage signal of the first input node P11 means: when the voltage signal of P1 is a positive voltage signal, the voltage signal of P11 is a positive voltage signal; and when the voltage signal of P1 is a negative voltage signal, the voltage signal of P11 is a negative voltage signal.

The absolute value of the voltage value of the voltage signal of the first node P1 being greater than the absolute value of the voltage value of the voltage signal of the first input node P11 means:

When the voltage signal of P11 is a positive voltage signal, the voltage value of the voltage signal of P1 is greater than the voltage value of the voltage signal of P11;

When the voltage signal of P11 is a negative voltage signal, the voltage value of the voltage signal of P1 is smaller than the voltage value of the voltage signal of P11.

When the gate driving unit in at least one embodiment of the present disclosure is in operation, the charge pump structure can further pull down or pull up the potential of the first node in the maintenance phase.

When the gate driving unit described in at least one embodiment of the present disclosure is in operation, when the potential of P11 is −5V, the potential of P1 is greater than or equal to −15V and less than or equal to −10V, that is, the charge pump circuit can pull down the potential of P11 2-3 times, but not limited to this.

In a specific implementation, the gate driving unit may include an output circuit, the output circuit includes a first output transistor, a control electrode of the first output transistor is electrically connected to the first node, and a first electrode of the first output transistor is electrically connected to an output voltage terminal, and a second electrode of the first output transistor is electrically connected to a gate driving signal output terminal.

Optionally, the first output transistor is a p-type transistor, and the first voltage signal is a negative voltage signal; or, The first output transistor is an n-type transistor of, the first voltage signal is a positive voltage signal.

In specific implementation, when the first output transistor is a p-type transistor, the first voltage signal may be a negative voltage signal, and the charge pump structure needs to further pull down the potential of the first node; when the first output transistor is an n-type transistor, the first voltage signal may be a positive voltage signal, and the charge pump structure needs to further pull up the potential of the first node; but not limited thereto. In at least one embodiment of the present disclosure, a working period of the gate driving unit may include an input phase, an output phase, a reset phase and a maintenance phase which are arranged in sequence. In the input phase, the input terminal provides an input signal; in the output phase, the gate driving unit outputs a valid gate driving signal; in the reset phase, the gate driving signal is reset, so that the gate driving unit outputs an invalid gate driving signal; in the maintenance phase, the gate driving unit keeps to output the invalid gate driving signal.

In a specific implementation, when the transistor included in the pixel circuit whose gate electrode is connected to the gate driving signal is an n-type transistor, the potential of the valid gate driving signal is a high voltage, and the potential of the invalid gate driving signal is a low voltage;

When the transistor included in the pixel circuit whose gate electrode is connected to the gate driving signal is a p-type transistor, the potential of the valid gate driving signal is a low voltage, and the potential of the invalid gate driving signal is a high voltage.

Figure 2:
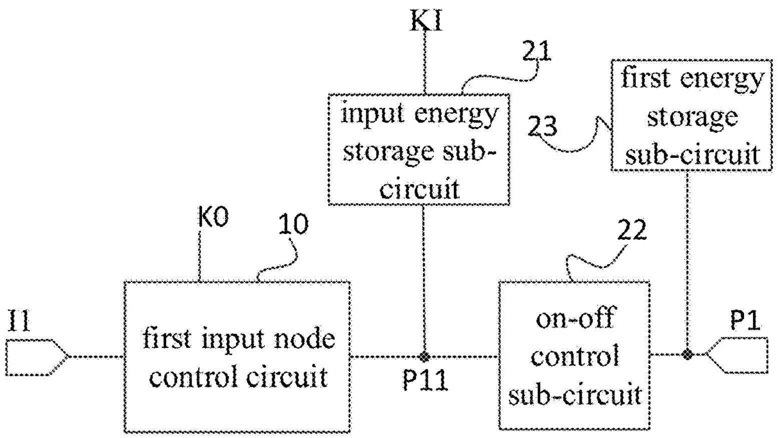
FIG. 2 is a structural diagram of a gate driving unit according to at least one embodiment of the present disclosure.

According to a specific implementation, as shown in FIG. 2, on the basis of the embodiment of the gate driving unit shown in FIG. 1, the charge pump circuit includes an input energy storage sub-circuit 21, an on-off control sub-circuit 22 and a first energy storage sub-circuit 23;

A first end of the input energy storage sub-circuit 21 is electrically connected to the input clock signal terminal KI, and a second end of the input energy storage sub-circuit 21 is electrically connected to the first input node P11, is configured to store electrical energy and control the potential of the first input node P11 according to a potential of the input clock signal;

The on-off control sub-circuit 22 is electrically connected to the first input node P11 and the first node P1 respectively, and is configured to connect to disconnect the first input node P11 and the first node P1 under the control of the potential of the first input node P11;

The first energy storage sub-circuit 23 is electrically connected to the first node P1 and configured to store electrical energy and keep the potential of the first node P1.

In the gate driving unit shown in FIG. 2, the input energy storage sub-circuit 21, the on-off control sub-circuit 22 and the first energy storage sub-circuit 23 form the charge pump circuit.

In at least one embodiment of the present disclosure, a ratio between a capacitance value of an input capacitor included in the input energy storage sub-circuit 21 and a capacitance value of a first storage capacitor included in the first energy storage sub-circuit may be greater than or equal to 1:1 and less than or equal to 10:1, but not limited thereto.

Optionally, the input energy storage sub-circuit includes an input capacitor, the first energy storage sub-circuit includes a first storage capacitor, and the on-off control sub-circuit includes an on-off control transistor;

A first end of the input capacitor is electrically connected to the input clock signal end, and a second end of the input capacitor is electrically connected to the first input node;

A first end of the first storage capacitor is electrically connected to the first node, and a second end of the first storage capacitor is electrically connected to the second voltage end;

A control electrode of the on-off control transistor and a first electrode of the on-off control transistor are electrically connected to the first input node, and a second electrode of the on-off control transistor is electrically connected to the first node.

In specific implementation, the input energy storage sub-circuit 21 and the first energy storage sub-circuit 23 may include capacitors, and the on-off control sub-circuit 22 may include transistors which are connected in a diode way, but not limited thereto.

Figure 3:
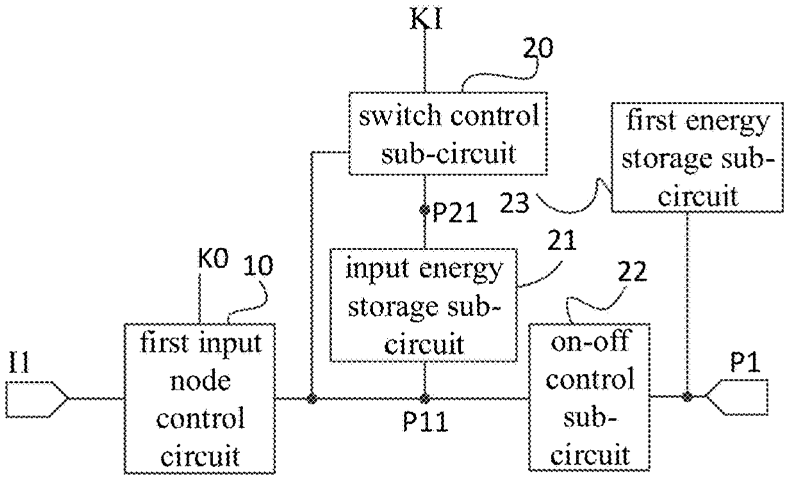
FIG. 3 is a structural diagram of a gate driving unit according to at least one embodiment of the present disclosure.

According to another specific implementation, as shown in FIG. 3, on the basis of the gate driving unit shown in FIG. 1, the charge pump circuit includes an input energy storage sub-circuit 21 and an on-off control sub-circuit 22, a switch control sub-circuit 20 and a first energy storage sub-circuit 23;

A first end of the input energy storage sub-circuit 21 is electrically connected to the first control node P21, and a second end of the input energy storage sub-circuit 21 is electrically connected to the first input node P11, is configured to store electrical energy and control the potential of the first input node P11 based on the potential of the first control node P21;

The on-off control sub-circuit 22 is electrically connected to the first input node P11 and the first node P1 respectively, and is configured to connect or disconnect the first input node P11 and the first node P1 under the control of the potential of the first input node P11;

the first energy storage sub-circuit 23 is electrically connected to the first node P1 and is configured to store electrical energy and keep the potential of the first node P1;

The switch control sub-circuit 20 is electrically connected to the first input node P11, the input clock signal terminal KI and the first control node P21, respectively, and is configured to connect to disconnect the input clock signal terminal KI and the first control node P21 under the control of the potential of the first input node P11.

In at least one embodiment of the gate driving unit shown in FIG. 3, the input energy storage sub-circuit 21, the on-off control sub-circuit 22, the switch control sub-circuit 20 and the first energy storage sub-circuit 23 form the charge pump circuit.

Compared with the gate driving unit shown in FIG. 2, in at least one embodiment of the gate driving circuit shown in FIG. 3, a switch control sub-circuit 20 is added to the charge pump circuit, and the switch control sub-circuit 20 controls to connect or disconnect the input clock signal terminal KI and the first control node P21 under the control of the potential of the first input node P11; the switch control sub-circuit 20 can control whether the input clock signal terminal KI is connected to the input energy storage sub-circuit 21, and whether the potential of P11 is controlled by the input clock signal.

Optionally, the input energy storage sub-circuit includes an input capacitor, the first energy storage sub-circuit includes a first storage capacitor, and the on-off control sub-circuit includes an on-off control transistor;

a first end of the input capacitor is electrically connected to the first control node, and a second end of the input capacitor is electrically connected to the first input node;

a first end of the first storage capacitor is electrically connected to the first node, and a second end of the first storage capacitor is electrically connected to the second voltage end;

a control electrode of the on-off control transistor and a first electrode of the on-off control transistor are electrically connected to the first input node, and a second electrode of the on-off control transistor is electrically connected to the first node.

Optionally, the switch control sub-circuit includes a switch control transistor;

a control electrode of the switch control transistor is electrically connected to the first input node, a first electrode of the switch control transistor is electrically connected to the input clock signal terminal, and a second electrode of the switch control transistor is electrically connected to the first control node.

In at least one embodiment of the present disclosure, the ratio between the capacitance value of the input capacitor and the capacitance value of the first storage capacitor is greater than or equal to 1 and less than or equal to 10, but not limited thereto.

Figure 4:
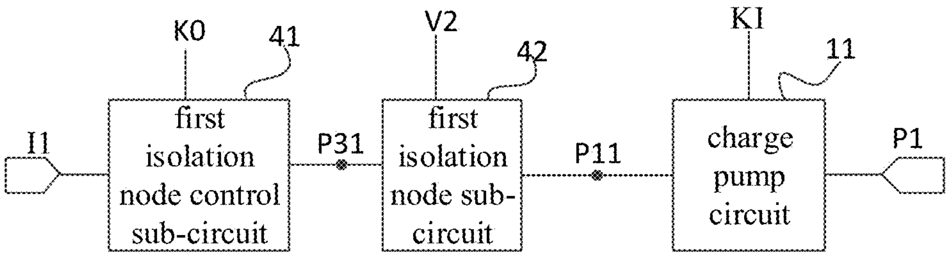
FIG. 4 is a structural diagram of a gate driving unit according to at least one embodiment of the present disclosure.

In specific implementation, as shown in FIG. 4, based on the embodiment of the gate driving unit shown in FIG. 1, the first input node control circuit may include a first isolation node control sub-circuit 41 and a first isolation node sub-circuit 42;

The first isolation node control sub-circuit 41 is electrically connected to the clock signal terminal K0, the input terminal I1 and a first isolation node P31 respectively, and is configured to connect or disconnect the input terminal I1 and the first isolation node P31 under the control of the clock signal provided by the clock signal terminal K0.

The first isolation sub-circuit 42 is electrically connected to the second voltage terminal V2, the first isolation node P31 and the first input node P11 respectively, and is configured to connect the first isolation node P31 and the first input node P11 under the control of the second voltage signal provided at the second voltage terminal V2.

When at least one embodiment of the gate driving unit shown in FIG. 4 is in operation, the first isolation sub-circuit 42 controls to connect the first isolation node P31 and the first input node P11, and the first isolation node control sub-circuit 41 controls whether to write the input signal into the first isolation node P31 under the control of the clock signal provided by K0.

According to a specific embodiment, the clock signal terminal may include a first clock signal terminal and a second clock signal terminal; the first isolation node control sub-circuit includes a first control transistor and a second control transistor; a control electrode of the first control transistor is electrically connected to the second clock signal terminal, a first electrode of the first control transistor is electrically connected to the input terminal, and a control electrode of the second control transistor is electrically connected to the first clock signal terminal, a first electrode of the second control transistor is electrically connected to a second electrode of the first control transistor, and a second electrode of the second control transistor is electrically connected to the first isolation node.

According to another specific implementation, the clock signal terminal may include a second clock signal terminal, and the first isolation node control sub-circuit may include a first control transistor; a control electrode of the first control transistor is connected to the second clock signal terminal, a first electrode of the first control transistor is electrically connected to the input terminal, and a second electrode of the first control transistor is electrically connected to the first isolation node.

According to yet another specific implementation, the clock signal terminal may include a first clock signal terminal, and the first isolation node control sub-circuit may include a second control transistor; a control electrode of the second control transistor is connected to the first clock signal terminal, a first electrode of the first control transistor is electrically connected to the input terminal, and a second electrode of the second control transistor is electrically connected to the first isolation node.

In actual operation, the first isolation node control sub-circuit may only include a first control transistor, and the control electrode of the first control transistor is electrically connected to the second clock signal terminal, as long as that the rising edge of the second clock signal is not earlier than the falling edge of the input signal provided by the input terminal; or, The first isolation node control sub-circuit may only include a second control transistor, and the control electrode of the second control transistor is electrically connected to the first clock signal terminal, as long as that the rising edge of the first clock signal is not earlier than the falling edge of the input signal provided by the input terminal.

Optionally, the first isolation sub-circuit includes a first isolation transistor;

A control electrode of the first isolation transistor is electrically connected to the second voltage terminal, a first electrode of the first isolation transistor is electrically connected to the first isolation node, and a second electrode of the first isolation transistor is electrically connected to the first input node.

In a specific implementation, when the first isolation transistor is a p-type transistor, the second voltage terminal may be a low voltage terminal; when the first isolation transistor is an n-type transistor, the second voltage terminal may is a high voltage terminal, so that the first isolation transistor is normally turned on.

In a preferred case, a first isolation transistor may be added in the first input node control circuit, so as to reduce the current leakage of the first isolation node and improve the output response speed.

Figure 5:
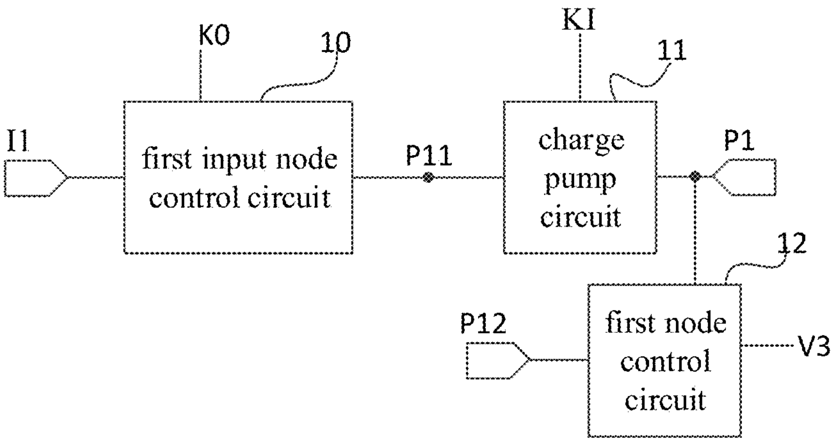
FIG. 5 is a structural diagram of a gate driving unit according to at least one embodiment of the present disclosure.

As shown in FIG. 5, on the basis of the embodiment of the gate driving unit shown in FIG. 1, the gate driving unit described in at least one embodiment of the present disclosure further includes a first node control circuit 12; the first node control circuit 12 is electrically connected to the second input node P12, the third voltage terminal V3 and the first node P1, respectively, and is configured to write the third voltage signal into the first node P1 under the control of the potential of the second input node P12;

The third voltage terminal V3 is configured to provide the third voltage signal.

In at least one embodiment of the present disclosure, the third voltage terminal V3 may be a high voltage terminal, and the third voltage signal may be a high voltage signal, but not limited thereto.

In at least one embodiment of the gate driving unit shown in FIG. 5, the gate driving unit described in at least one embodiment of the present disclosure may further include a first node control circuit 12, and the first node control circuit 12 is configured to control the potential of the first node P1 under the control of the potential of the second input node P12.

According to a specific implementation, the gate driving unit described in at least one embodiment of the present disclosure may further include a first energy storage circuit;

The first energy storage circuit is electrically connected to the second node and the second clock signal terminal respectively, and is configured to control the potential of the second node based on the second clock signal.

In at least one embodiment of the present disclosure, the gate driving unit may further include a first energy storage circuit, and in a preferred case, the first energy storage circuit may control the potential of the second node according to the second clock signal, so that in the reset phase, the potential of the second node can be changed by the second clock signal, the gate driving signal outputted by the gate driving unit can be simultaneously reset by the first output transistor controlled by the first node and the second output transistor controlled by the second node, to achieve a complete and fast reset of the gate driving signal.

According to another specific implementation, the gate driving unit described in at least one embodiment of the present disclosure may further include a gate driving signal output terminal and a first energy storage circuit;

The first energy storage circuit is electrically connected to the second node and the gate driving signal output terminal respectively, and is configured to control the potential of the second node according to the gate driving signal outputted by the gate driving signal output terminal.

In at least one embodiment of the present disclosure, the gate driving unit may further include a first energy storage circuit, and in a preferred case, the first energy storage circuit is electrically connected to the gate driving signal output terminal of the gate driving unit, so that the capacitive load of the first energy storage circuit is reduced, which is beneficial to reduce power consumption.

Specifically, the gate driving unit described in at least one embodiment of the present disclosure may further include a gate driving signal output terminal and an output circuit;

The output circuit is respectively electrically connected to the first node, the second node, the gate driving signal output terminal, the output voltage terminal and the second clock signal output terminal, and is configured to write the output voltage signal into the gate driving signal output terminal under the control of the potential of the first node, and control to write a second clock signal into the gate driving signal output terminal under the control of the potential of the second node;

The output voltage terminal is used for providing an output voltage signal.

In a specific implementation, the gate driving unit may include a gate driving signal output terminal and an output circuit, and the output circuit controls to output the gate driving signal under the control of the potential of the first node and the potential of the second node.

Optionally, the output circuit includes a first output transistor and a second output transistor;

A control electrode of the first output transistor is electrically connected to the first node, a first electrode of the first output transistor is electrically connected to the output voltage terminal, and a second electrode of the first output transistor is electrically connected to the gate driving signal output terminal;

A control electrode of the second output transistor is electrically connected to the second node, a first electrode of the second output transistor is electrically connected to the gate driving signal output terminal, and a second electrode of the second output transistor is electrically connected to the second clock signal terminal.

Specifically, the gate driving unit described in at least one embodiment of the present disclosure may further include a second node control circuit;

The second node control circuit includes a third input node control sub-circuit, a second input node control sub-circuit and a second node control sub-circuit;

The third input node control sub-circuit is respectively electrically connected to the first clock signal terminal, the second voltage terminal, the first input node and the third input node, and is configured to write the second voltage signal into the third input node under the control of the first clock signal, and control to write the first clock signal into the third input node under the control of the potential of the first input node;

The second input node control sub-circuit is respectively electrically connected to the third input node, the second input node and the input clock signal terminal, and is configured to write the input clock signal into the second input node under the control of the potential of the third input node, and control the potential of the second input node according to the potential of the third input node;

The second node control sub-circuit is respectively electrically connected to the second input node, the first input node, the second node and the input clock signal terminal, and the second node control sub-circuit is further connected to the second clock signal terminal or the third voltage terminal, is configured to connect or disconnect the second input node and the second node under the control of an input clock signal, and write the second clock signal or the third voltage signal into the second node under the control of the potential of the first input node.

In a specific implementation, the gate driving unit may further include a second node control circuit, the second node control circuit includes a third input node control sub-circuit, a second input node control sub-circuit and a second node control sub-circuit, the third input node control sub-circuit controls the potential of the third input node, the second input node control sub-circuit controls the potential of the second input node, and the second node control sub-circuit controls the potential of the second node.

Optionally, the third input node control sub-circuit includes a third control transistor and a fourth control transistor, wherein, A control electrode of the third control transistor is electrically connected to the first clock signal terminal, a first electrode of the third control transistor is electrically connected to the second voltage terminal, and a second electrode of the third control transistor is electrically connected to the third input node;

A control electrode of the fourth control transistor is electrically connected to the first input node, a first electrode of the fourth control transistor is electrically connected to the first clock signal terminal, and a second electrode of the fourth control transistor is electrically connected to the third input node.

During specific implementation, the gate driving unit described in at least one embodiment of the present disclosure may further include a second node control circuit;

The second node control circuit includes a third input node control sub-circuit, a second input node control sub-circuit and a second node control sub-circuit;

The third input node control sub-circuit is respectively electrically connected to the first clock signal terminal, the second voltage terminal, the first isolation node and the third input node, and is configured to write the second voltage signal into the third input node under the control of the first clock signal, and write the first clock signal into the third input node under the control of the potential of the first isolation node;

The second input node control sub-circuit is respectively electrically connected to the third input node, the second input node and the input clock signal terminal, and is configured to write the input clock signal into the second input node under the control of the potential of the third input node, and control the potential of the second input node according to the potential of the third input node;

The second node control sub-circuit is respectively electrically connected to the second input node, the first input node, the second node and the input clock signal terminal, and the second node control sub-circuit is further connected to the second clock signal terminal or the first clock signal terminal, and is configured to connect or disconnect the second input node and the second node under the control of an input clock signal, and write the second clock signal or the third voltage signal into the second node under the control of the potential of the first input node.

Optionally, the third input node control sub-circuit includes a third control transistor and a fourth control transistor, wherein, A control electrode of the third control transistor is electrically connected to the first clock signal terminal, a first electrode of the third control transistor is electrically connected to the second voltage terminal, and a second electrode of the third control transistor is electrically connected to the third input node;

A control electrode of the fourth control transistor is electrically connected to the first isolation node, a first electrode of the fourth control transistor is electrically connected to the first clock signal terminal, and a second electrode of the fourth control transistor is electrically connected is electrically connected to the third input node.

Optionally, the third input node control sub-circuit includes a third control transistor, a fourth control transistor and a second isolation transistor;

A control electrode of the third control transistor is electrically connected to the first clock signal terminal, a first electrode of the third control transistor is electrically connected to the second voltage terminal, and a second electrode of the third control transistor is electrically connected to the second isolation node;

A control electrode of the fourth control transistor is electrically connected to the first isolation node, a first electrode of the fourth control transistor is electrically connected to the first clock signal terminal, and a second electrode of the fourth control transistor is electrically connected electrically connected to the second isolation node;

A control electrode of the second isolation transistor is electrically connected to the second voltage terminal, a first electrode of the second isolation transistor is electrically connected to the second isolation node, and a second electrode of the second isolation transistor is electrically connected to the third input node.

In a preferred case, the third input node control sub-circuit may use a second isolation transistor to prevent current leakage of the third input node.

Optionally, the second input node control sub-circuit includes a fifth control transistor and a first capacitor;

A control electrode of the fifth control transistor is electrically connected to the third input node, a first electrode of the fifth control transistor is electrically connected to the second input node, and a second electrode of the fifth control transistor is electrically connected to the input clock signal terminal;

A first end of the first capacitor is electrically connected to the third input node, and a second end of the first capacitor is electrically connected to the second input node.

Optionally, the second node control sub-circuit includes a sixth control transistor and a seventh control transistor;

A control electrode of the sixth control transistor is electrically connected to the input clock signal terminal, a first electrode of the sixth control transistor is electrically connected to the second input node, and a second electrode of the sixth control transistor is electrically connected to the second node;

A control electrode of the seventh control transistor is electrically connected to the first isolation node, a first electrode of the seventh control transistor is electrically connected to the second clock signal terminal or the third voltage terminal, and a second electrode the seventh control transistor is electrically connected to the second node.

Figure 6:
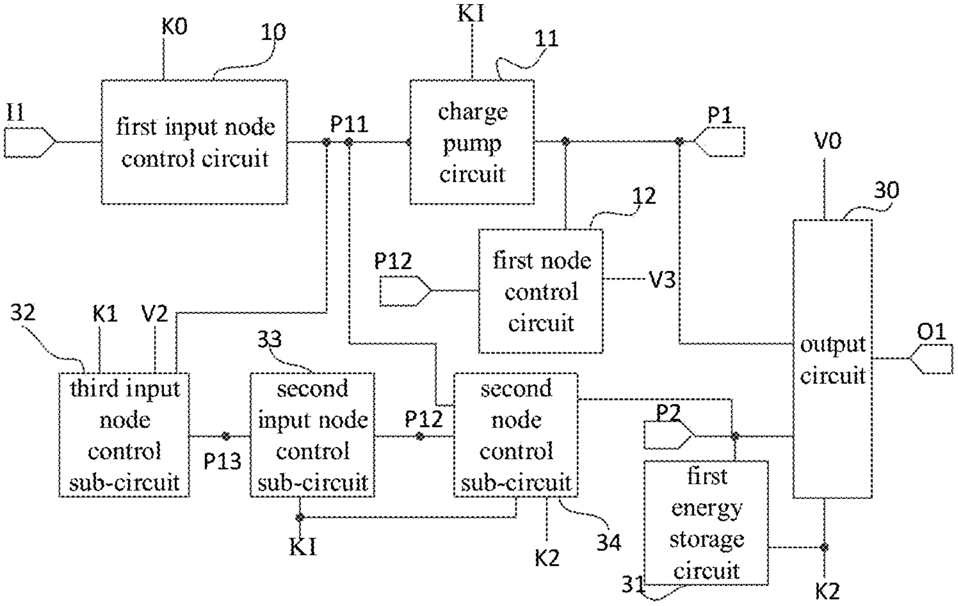
FIG. 6 is a structural diagram of a gate driving unit according to at least one embodiment of the present disclosure.

As shown in FIG. 6, on the basis of at least one embodiment of the gate driving unit shown in FIG. 5, the gate driving unit according to at least one embodiment of the present disclosure may further include a first energy storage circuit 31, a gate driving signal output terminal O1, an output circuit 30 and a second node control circuit;

The first energy storage circuit 31 is electrically connected to the second node P2 and the second clock signal terminal K2 respectively, and is configured to control the potential of the second node P2 according to the second clock signal; the second clock signal terminal K2 is used for providing the second clock signal;

The output circuit 30 is respectively electrically connected to the first node P1, the second node P2, the gate driving signal output terminal O1, the output voltage terminal V0 and the second clock signal output terminal K2, and is configured to write the output voltage signal into the gate driving signal output terminal O1 under the control of the potential of the first node P1, and write the second clock signal into the gate driving signal output terminal O1 under the control of the potential of the second node P2; the output voltage terminal V0 is used to provide the output voltage signal;

The second node control circuit includes a third input node control sub-circuit 32, a second input node control sub-circuit 33 and a second node control sub-circuit 34;

The third input node control sub-circuit 32 is electrically connected to the first clock signal terminal K1, the second voltage terminal V2, the first input node P11 and the third input node P13 respectively, and is configured to write the second voltage signal into the third input node P13 under the control of the first clock signal, and write the first clock signal into the third input node P13 under the control of the potential of the first input node P11; the first clock signal terminal K1 is used to provide the first clock signal;

The second input node control sub-circuit 33 is respectively electrically connected to the third input node P13, the second input node P12 and the input clock signal terminal KI, and is configured write the input clock signal into the second input node P12 under the control of the potential of the third input node P13, and control the potential of the second input node P12 according to the potential of the third input node P13; the input clock signal terminal KI is used to provide the input clock signal;

The second node control sub-circuit 34 is electrically connected to the input clock signal terminal KI, the second input node P12, the second node P2, the first input node P11 and the second clock signal terminal K2, respectively, and is configured to connect or disconnect the second input node P12 and the second node P2 under the control of the input clock signal, and write the second clock signal into the second node P2 under the control of the potential of the first input node P11.

In at least one embodiment of the present disclosure, the output voltage signal may be a low voltage signal, but is not limited thereto.

Figure 7:
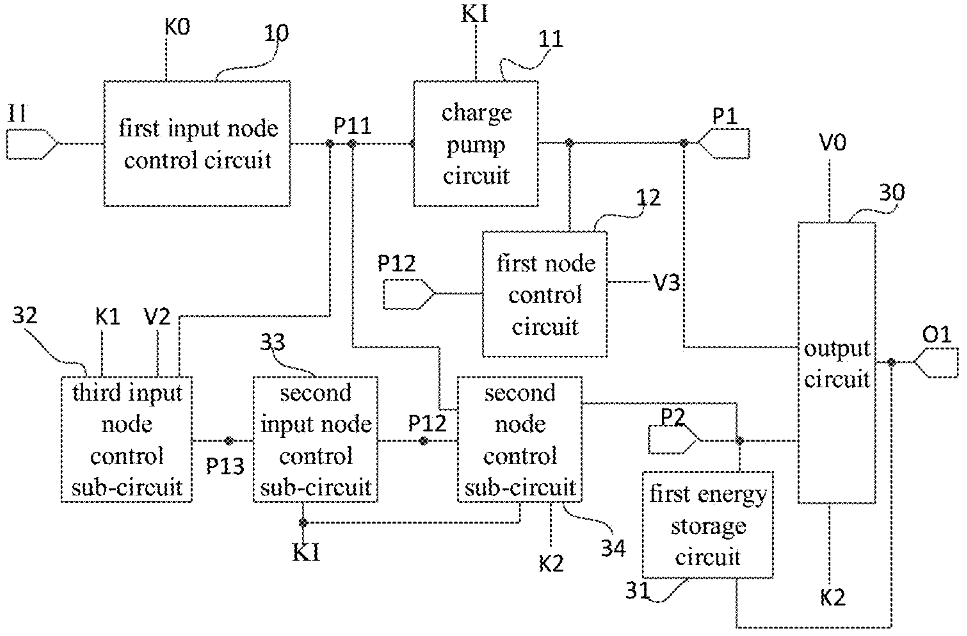
FIG. 7 is a structural diagram of a gate driving unit according to at least one embodiment of the present disclosure.

As shown in FIG. 7, on the basis of at least one embodiment of the gate driving unit shown in FIG. 5, the gate driving unit according to at least one embodiment of the present disclosure may further include a first energy storage circuit 31, a gate driving signal output terminal O1, an output circuit 30 and a second node control circuit;

The first energy storage circuit 31 is electrically connected to the second node P2 and the gate driving signal output terminal O1 respectively, and is configured to control the potential of the second node P2 according to the gate driving signal outputted by the gate driving signal output terminal O1;

The output circuit 30 is respectively electrically connected to the first node P1, the second node P2, the gate driving signal output terminal O1, the output voltage terminal V0 and the second clock signal output terminal K2, and is configured to write the output voltage signal into the gate driving signal output terminal O1 under the control of the potential of the first node P1, and write the second clock signal into the gate driving signal output terminal O1 under the control of the potential of the second node P2; the output voltage terminal V0 is used to provide the output voltage signal;

The second node control circuit includes a third input node control sub-circuit 32, a second input node control sub-circuit 33 and a second node control sub-circuit 34;

The third input node control sub-circuit 32 is electrically connected to the first clock signal terminal K1, the second voltage terminal V2, the first input node P11 and the third input node P13 respectively, and is configured to write the second voltage signal into the third input node P13 under the control of the first clock signal, and write the first clock signal into the third input node P13 under the control of the potential of the first input node P11; the first clock signal terminal K1 is used to provide the first clock signal;

The second input node control sub-circuit 33 is respectively electrically connected to the third input node P13, the second input node P12 and the input clock signal terminal KI, and is configured write the input clock signal into the second input node P12 under the control of the potential of the third input node P13, and control the potential of the second input node P12 according to the potential of the third input node P13; the input clock signal terminal KI is used to provide the input clock signal;

The second node control sub-circuit 34 is respectively electrically connected to the input clock signal terminal KI, the second input node P12, the second node P2, the first input node P11, the second clock signal terminal K2 and the second node P2, is configured to connect or disconnect the second input node P12 and the second node P2 under the control of the input clock signal, and write the second clock signal into the second node P2 under the control of the potential of the first input node P11.

The difference between at least one embodiment of the gate driving unit shown in FIG. 7 and at least one embodiment of the gate driving unit shown in FIG. 6 is that the first energy storage circuit 31 is electrically connected to the gate driving signal output end O1, to control the potential of the second node P2 according to the gate driving signal outputted from the gate driving signal output terminal O1.

Figure 8:
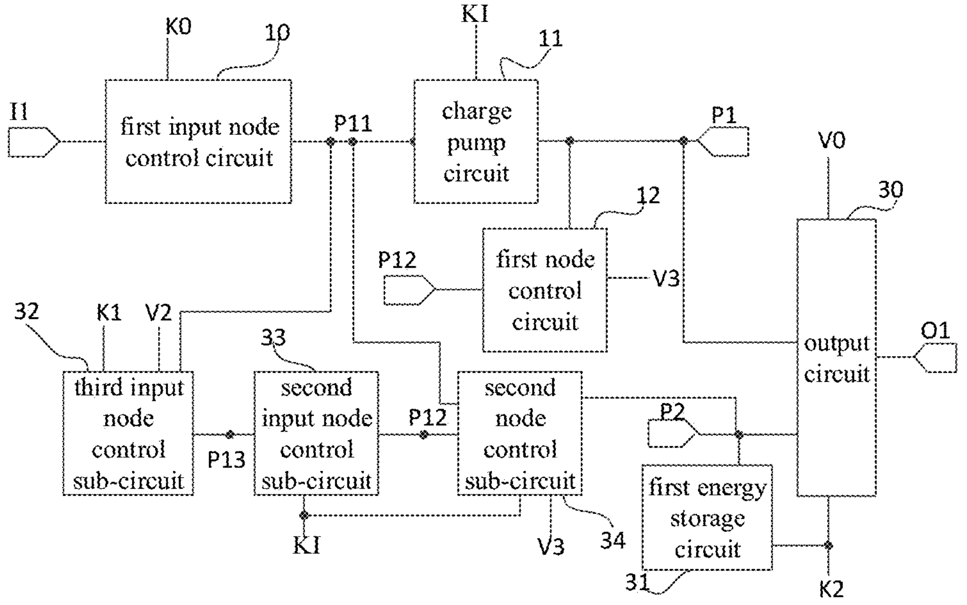
FIG. 8 is a structural diagram of a gate driving unit according to at least one embodiment of the present disclosure.

As shown in FIG. 8, on the basis of at least one embodiment of the gate driving unit shown in FIG. 5, the gate driving unit described in at least one embodiment of the present disclosure may further include a first energy storage circuit 31, a gate driving signal output terminal O1, an output circuit 30 and a second node control circuit;

The first energy storage circuit 31 is electrically connected to the second node P2 and the second clock signal terminal K2 respectively, and is configured to control the potential of the second node P2 according to the second clock signal; the second clock signal terminal K2 is used for providing the second clock signal;

The output circuit 30 is respectively electrically connected to the first node P1, the second node P2, the gate driving signal output terminal O1, the output voltage terminal V0 and the second clock signal output terminal K2, and is configured to write the output voltage signal into the gate driving signal output terminal O1 under the control of the potential of the first node P1, and write the second clock signal into the gate driving signal output terminal O1 under the control of the potential of the second node P2; the output voltage terminal V0 is used to provide the output voltage signal;

The second node control circuit includes a third input node control sub-circuit 32, a second input node control sub-circuit 33 and a second node control sub-circuit 34;

The third input node control sub-circuit 32 is electrically connected to the first clock signal terminal K1, the second voltage terminal V2, the first input node P11 and the third input node P13 respectively, and is configured to write the second voltage signal into the third input node P13 under the control of the first clock signal, and write the first clock signal into the third input node P13 under the control of the potential of the first input node P11; the first clock signal terminal K1 is used to provide the first clock signal;

The second input node control sub-circuit 33 is respectively electrically connected to the third input node P13, the second input node P12 and the input clock signal terminal KI, and is used to write the input clock signal into the second input node P12 under the control of the potential of the third input node P13, and control the potential of the second input node P12 according to the potential of the third input node P13; the input clock signal terminal KI is used to provide the input clock signal;

The second node control sub-circuit 34 is respectively electrically connected to the input clock signal terminal KI, the second input node P12, the second node P2, the first input node P11, the third voltage terminal V3 and the second node P2, and is configured to connect or disconnect the second input node P12 and the second node P2 under the control of the input clock signal, and write the third voltage signal into the second node P2 under the control of the potential of the first input node P11; the third voltage terminal V3 is used for providing the third voltage signal.

The difference between at least one embodiment of the gate driving unit shown in FIG. 8 and at least one embodiment of the gate driving unit shown in FIG. 6 is that the second node control sub-circuit 34 is electrically connected to the third voltage terminal V3, and write the third voltage signal into the second node P2 under the control of the potential of the first input node P11.

Figure 9:
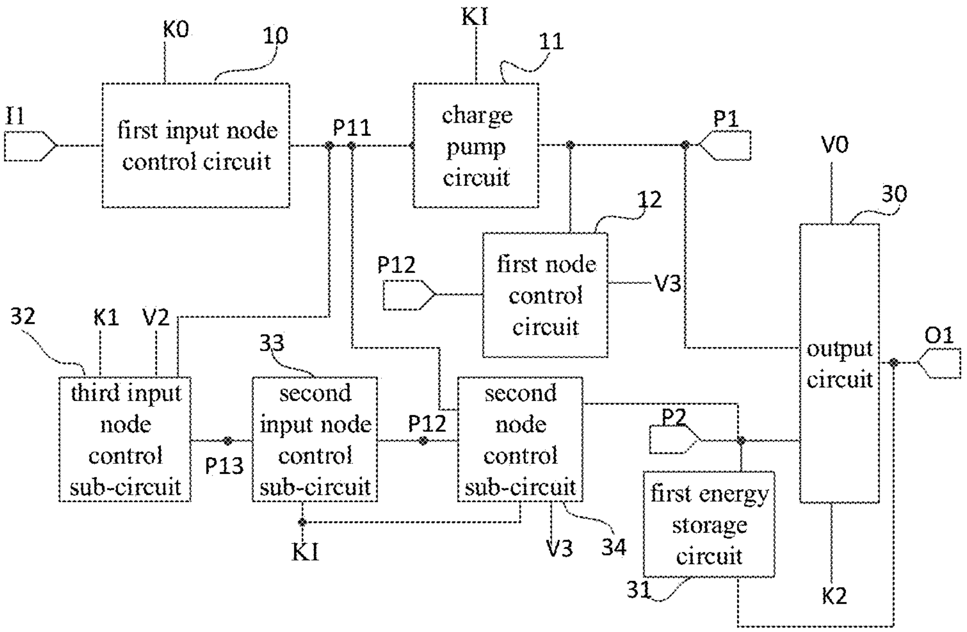
FIG. 9 is a structural diagram of a gate driving unit according to at least one embodiment of the present disclosure.

As shown in FIG. 9, on the basis of at least one embodiment of the gate driving unit shown in FIG. 5, the gate driving unit according to at least one embodiment of the present disclosure may further include a first energy storage circuit 31, a gate a driving signal output terminal O1, an output circuit 30 and a second node control circuit;

The first energy storage circuit 31 is electrically connected to the second node P2 and the gate driving signal output terminal O1 respectively, and is configured to control the potential of the second node P2 according to the gate driving signal outputted by the gate driving signal output terminal O1;

The output circuit 30 is respectively electrically connected to the first node P1, the second node P2, the gate driving signal output terminal O1, the output voltage terminal V0 and the second clock signal output terminal K2, and is configured to write the output voltage signal into the gate driving signal output terminal O1 under the control of the potential of the first node P1, and write the second clock signal into the gate driving signal output terminal O1 under the control of the potential of the second node P2; the output voltage terminal V0 is used to provide the output voltage signal;

The second node control circuit includes a third input node control sub-circuit 32, a second input node control sub-circuit 33 and a second node control sub-circuit 34;

The third input node control sub-circuit 32 is electrically connected to the first clock signal terminal K1, the second voltage terminal V2, the first input node P11 and the third input node P13 respectively, and is configured to write the second voltage signal into the third input node P13 under the control of the first clock signal, and write the first clock signal into the third input node P13 under the control of the potential of the first input node P11; the first clock signal terminal K1 is used to provide the first clock signal;

The second input node control sub-circuit 33 is respectively electrically connected to the third input node P13, the second input node P12 and the input clock signal terminal KI, and is used to write the input clock signal into the second input node P12 under the control of the potential of the third input node P13, and control the potential of the second input node P12 according to the potential of the third input node P13; the input clock signal terminal KI is used to provide the input clock signal;

The second node control sub-circuit 34 is respectively electrically connected to the input clock signal terminal KI, the second input node P12, the second node P2, the first input node P11, the third voltage terminal V3 and the second node P2, and is configured to connect or disconnect the second input node P12 and the second node P2 under the control of the input clock signal, and write the third voltage signal into the second node P2 under the control of the potential of the first input node P11.

The difference between at least one embodiment of the gate driving unit shown in FIG. 9 and at least one embodiment of the gate driving unit shown in FIG. 7 is that the second node control sub-circuit 34 is electrically connected to the third voltage terminal V3, and configured to write the third voltage signal into the second node P2 under the control of the potential of the first input node P11.

Figure 10:
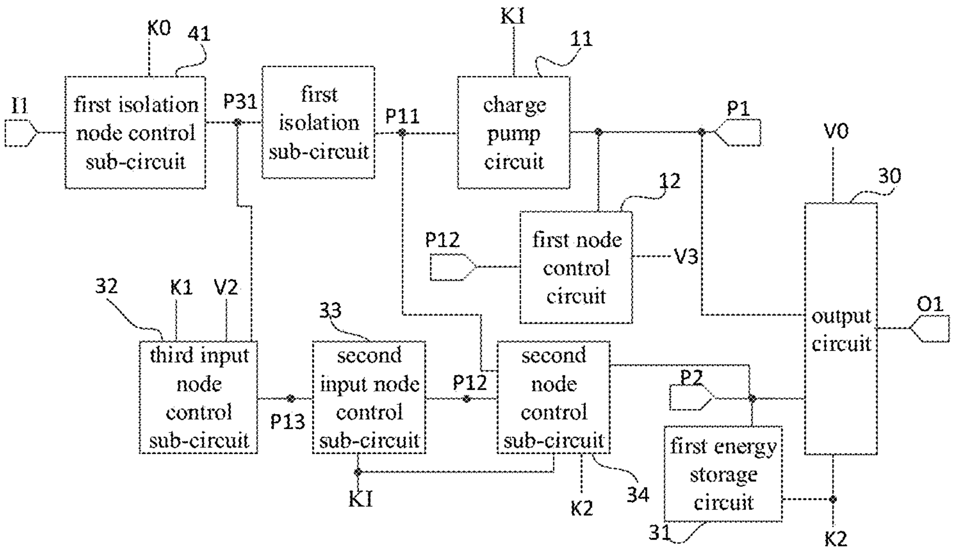
FIG. 10 is a structural diagram of a gate driving unit according to at least one embodiment of the present disclosure.

As shown in FIG. 10, on the basis of at least one embodiment of the gate driving unit shown in FIG. 5, the gate driving unit described in at least one embodiment of the present disclosure may further include a first energy storage circuit 31, a gate driving signal output terminal O1, an output circuit 30 and a second node control circuit;

The first input node control circuit may include a first isolation node control sub-circuit 41 and a first isolation sub-circuit 42;

The first isolation node control sub-circuit 41 is electrically connected to the clock signal terminal K0, the input terminal I1 and the first isolation node P31 respectively, and is configured to connect or disconnect the input terminal I1 and the first isolation node P31 under the control of the clock signal provided by the clock signal terminal K0;

The first isolation sub-circuit 42 is electrically connected to the second voltage terminal V2, the first isolation node P31 and the first input node P11 respectively, and is configured to connect the first isolation node P31 and the first input node P11 under the control of the second voltage signal provided by the second voltage terminal V2;

The first energy storage circuit 31 is electrically connected to the second node P2 and the second clock signal terminal K2 respectively, and is configured to control the potential of the second node P2 according to the second clock signal; the second clock signal terminal K2 is used for providing the second clock signal;

The output circuit 30 is respectively electrically connected to the first node P1, the second node P2, the gate driving signal output terminal O1, the output voltage terminal V0 and the second clock signal output terminal K2, and is configured to write the output voltage signal into the gate driving signal output terminal O1 under the control the potential of the first node P1, and write the second clock signal into the gate driving signal output terminal Olunder the control of the potential of the second node P2; the output voltage terminal V0 is used to provide the output voltage signal;

The second node control circuit includes a third input node control sub-circuit 32, a second input node control sub-circuit 33 and a second node control sub-circuit 34;

The third input node control sub-circuit 32 is respectively electrically connected to the first clock signal terminal K1, the second voltage terminal V2, the first isolation node P31 and the third input node P13, and is configured to write the second voltage signal into the third input node P13 under the control of the first clock signal, and write the first clock signal into the third input node P13 under the control of the potential of the first isolation node P31; the first clock signal terminal K1 is used to provide the first clock signal;

The second input node control sub-circuit 33 is respectively electrically connected to the third input node P13, the second input node P12 and the input clock signal terminal KI, and is used to write the input clock signal into the second input node P12 under the control of the potential of the third input node P13, and is used to control the potential of the second input node P12 according to the potential of the third input node P13; the input clock signal terminal KI is used to provide the input clock signal;

The second node control sub-circuit 34 is electrically connected to the input clock signal terminal KI, the second input node P12, the second node P2, the first input node P11 and the second clock signal terminal K2, respectively, and is configured to connect or disconnect the second input node P12 and the second node P2 under the control of the input clock signal, and write the second clock signal into the second node P2 under the control of the potential of the first input node P11.

The difference between at least one embodiment of the gate driving unit shown in FIG. 10 of the present disclosure and at least one embodiment of the gate driving unit shown in FIG. 6 of the present disclosure is as follows: the first input node control circuit includes a first isolation node control sub-circuit 41 and the first isolation sub-circuit 42, the third input node control sub-circuit 32 is electrically connected to the first isolation node P31 instead of the first input node.

Figure 11:
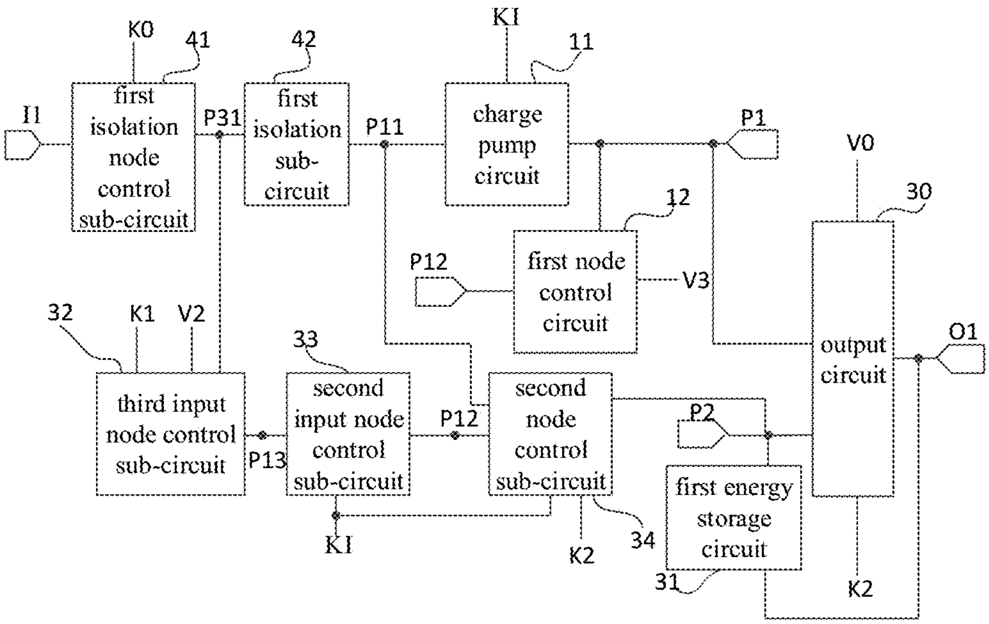
FIG. 11 is a structural diagram of a gate driving unit according to at least one embodiment of the present disclosure.

As shown in FIG. 11, on the basis of at least one embodiment of the gate driving unit shown in FIG. 5, the gate driving unit according to at least one embodiment of the present disclosure may further include a first energy storage circuit 31, a gate driving signal output terminal O1, an output circuit 30 and a second node control circuit;

The first input node control circuit may include a first isolation node control sub-circuit 41 and a first isolation sub-circuit 42;

The first isolation node control sub-circuit 41 is electrically connected to the clock signal terminal K0, the input terminal I1 and the first isolation node P31 respectively, and is configured to connect or disconnect the input terminal I1 and the first isolation node P31 under the control of the clock signal provided by the clock signal terminal K0;

The first isolation sub-circuit 42 is electrically connected to the second voltage terminal V2, the first isolation node P31 and the first input node P11 respectively, and is configured to connect the first isolation node P31 and the first input node P11 under the control of the second voltage signal provided by the second voltage terminal V2;

The first energy storage circuit 31 is electrically connected to the second node P2 and the gate driving signal output terminal O1 respectively, and is configured to control the potential of the second node P2 according to the gate driving signal outputted by the gate driving signal output terminal O1;

The output circuit 30 is respectively electrically connected to the first node P1, the second node P2, the gate driving signal output terminal O1, the output voltage terminal V0 and the second clock signal output terminal K2, and is configured to write the output voltage signal into the gate driving signal output terminal O1 under the control of the potential of the first node P1, and write the second clock signal into the gate driving signal output terminal O1 under the control of the potential of the second node P2; the output voltage terminal V0 is used to provide the output voltage signal;

The second node control circuit includes a third input node control sub-circuit 32, a second input node control sub-circuit 33 and a second node control sub-circuit 34;

The third input node control sub-circuit 32 is respectively electrically connected to the first clock signal terminal K1, the second voltage terminal V2, the first isolation node P31 and the third input node P13, and is configured to write the second voltage signal into the third input node P13 under the control of the first clock signal, and write the first clock signal into the third input node P13 under the control of the potential of the first isolation node P31; the first clock signal terminal K1 is used to provide the first clock signal;

The second input node control sub-circuit 33 is respectively electrically connected to the third input node P13, the second input node P12 and the input clock signal terminal KI, and is used to write the input clock signal into the second input node P12 under the control of the potential of the third input node P13, and control the potential of the second input node P12 according to the potential of the third input node P13; the input clock signal terminal KI is used to provide the input clock signal;

The second node control sub-circuit 34 is respectively electrically connected to the input clock signal terminal KI, the second input node P12, the second node P2, the first input node P11, the second clock signal terminal K2 and the second node P2, is configured to connect or disconnect the second input node P12 and the second node P2 under the control of the input clock signal, and write the second clock signal into the second node P2 under the control of the potential of the first input node P11.

The difference between at least one embodiment of the gate driving unit shown in FIG. 11 of the present disclosure and at least one embodiment of the gate driving unit shown in FIG. 7 of the present disclosure is as follows: the first input node control circuit includes a first isolation node control sub-circuit 41 and the first isolation sub-circuit 42, the third input node control sub-circuit 32 is electrically connected to the first isolation node P31 instead of the first input node.

Figure 12:
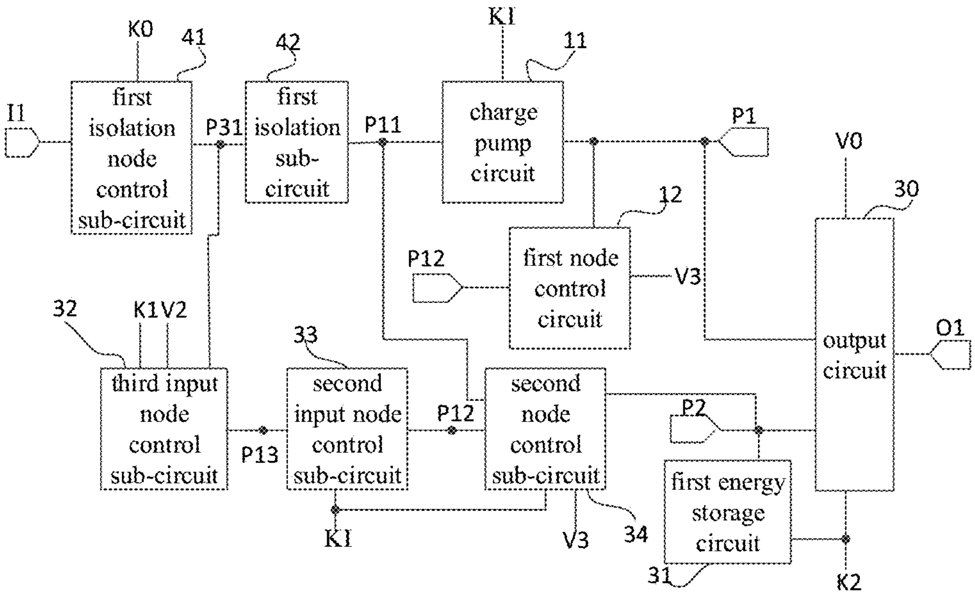
FIG. 12 is a structural diagram of a gate driving unit according to at least one embodiment of the present disclosure.

As shown in FIG. 12, on the basis of at least one embodiment of the gate driving unit shown in FIG. 5, the gate driving unit according to at least one embodiment of the present disclosure may further include a first energy storage circuit 31, a gate driving signal output terminal O1, an output circuit 30 and a second node control circuit;

The first input node control circuit may include a first isolation node control sub-circuit 41 and a first isolation sub-circuit 42;

The first isolation node control sub-circuit 41 is electrically connected to the clock signal terminal K0, the input terminal I1 and the first isolation node P31 respectively, and is configured to connect or disconnect the input terminal I1 and the first isolation node P31 under the control of the clock signal provided by the clock signal terminal K0.

The first isolation sub-circuit 42 is electrically connected to the second voltage terminal V2, the first isolation node P31 and the first input node P11 respectively, and is configured to connect the first isolation node P31 and the first input node P11 under the control of the second voltage signal provided by the second voltage terminal V2;

The first energy storage circuit 31 is electrically connected to the second node P2 and the second clock signal terminal K2 respectively, and is configured to control the potential of the second node P2 according to the second clock signal; the second clock signal terminal K2 is used for providing the second clock signal;

The output circuit 30 is respectively electrically connected to the first node P1, the second node P2, the gate driving signal output terminal O1, the output voltage terminal V0 and the second clock signal output terminal K2, and is used to write the output voltage signal into the gate driving signal output terminal O1 under the control of the potential of the first node P1, and write the second clock signal into the gate driving signal output terminal O1 under the control of the potential of the second node P2; the output voltage terminal V0 is used to provide the output voltage signal;

The second node control circuit includes a third input node control sub-circuit 32, a second input node control sub-circuit 33 and a second node control sub-circuit 34;

The third input node control sub-circuit 32 is respectively electrically connected to the first clock signal terminal K1, the second voltage terminal V2, the first isolation node P31 and the third input node P13, and is configured to write the second voltage signal into the third input node P13 under the control of the first clock signal, and write the first clock signal into the third input node P13 under the control of the potential of the first isolation node P31; the first clock signal terminal K1 is used to provide the first clock signal;

The second input node control sub-circuit 33 is respectively electrically connected to the third input node P13, the second input node P12 and the input clock signal terminal KI, and is configured to write the input clock signal into the second input node P12 under the control of the potential of the third input node P13, and control the potential of the second input node P12 according to the potential of the third input node P13; the input clock signal terminal KI is used to provide the input clock signal;

The second node control sub-circuit 34 is respectively electrically connected to the input clock signal terminal KI, the second input node P12, the second node P2, the first input node P11, the third voltage terminal V3 and the second node P2, and is configured to connect or disconnect the second input node P12 and the second node P2 under the control of the input clock signal, and write the third voltage signal into the second node P2 under the control of the potential of the first input node P11; the third voltage terminal V3 is used for providing the third voltage signal.

The difference between at least one embodiment of the gate driving unit shown in FIG. 12 of the present disclosure and at least one embodiment of the gate driving unit shown in FIG. 8 of the present disclosure is as follows: the first input node control circuit includes a first isolation node control sub-circuit 41 and the first isolation sub-circuit 42, the third input node control sub-circuit 32 is electrically connected to the first isolation node P31 instead of the first input node.

Figure 13:
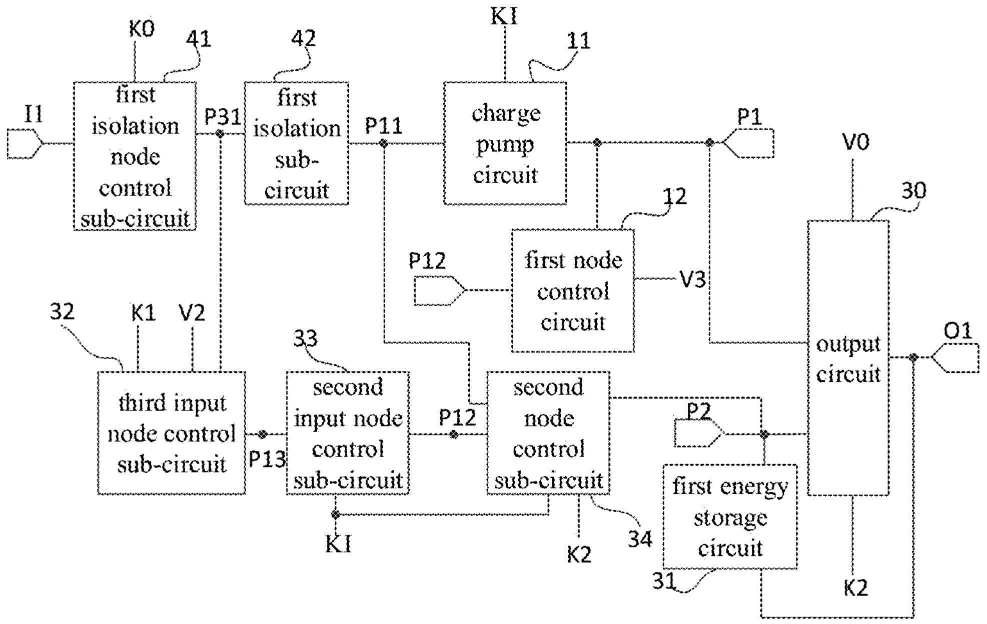
FIG. 13 is a structural diagram of a gate driving unit according to at least one embodiment of the present disclosure.

As shown in FIG. 13, on the basis of at least one embodiment of the gate driving unit shown in FIG. 5, the gate driving unit according to at least one embodiment of the present disclosure may further include a first energy storage circuit 31, a gate driving signal output terminal O1, an output circuit 30 and a second node control circuit;

The first input node control circuit may include a first isolation node control sub-circuit 41 and a first isolation sub-circuit 42;

The first isolation node control sub-circuit 41 is electrically connected to the clock signal terminal K0, the input terminal I1 and the first isolation node P31 respectively, and is configured to connect or disconnect the input terminal I1 and the first isolation node P31 under the control of the clock signal provided by the clock signal terminal K0;

The first isolation sub-circuit 42 is electrically connected to the second voltage terminal V2, the first isolation node P31 and the first input node P11 respectively, and is configured to connect the first isolation node P31 and the first input node P11 under the control of the second voltage signal provided by the second voltage terminal V2;

The first energy storage circuit 31 is electrically connected to the second node P2 and the gate driving signal output terminal O1 respectively, and is configured to control the potential of the second node P2 according to the gate driving signal outputted by the gate driving signal output terminal O1;

The output circuit 30 is respectively electrically connected to the first node P1, the second node P2, the gate driving signal output terminal O1, the output voltage terminal V0 and the second clock signal output terminal K2, and is configured to write the output voltage signal into the gate driving signal output terminal O1 under the control of the potential of the first node P1, and write the second clock signal into the gate driving signal output terminal O1 under the control of the potential of the second node P2; the output voltage terminal V0 is used to provide the output voltage signal;

The second node control circuit includes a third input node control sub-circuit 32, a second input node control sub-circuit 33 and a second node control sub-circuit 34;

The third input node control sub-circuit 32 is electrically connected to the first clock signal terminal K1, the second voltage terminal V2, the first input node P11 and the third input node P13 respectively, and is configured to write the second voltage signal into the third input node P13 under the control of the first clock signal, and write the first clock signal into the third input node P13 under the control of the potential of the first input node P11; the first clock signal terminal K1 is used to provide the first clock signal;

The second input node control sub-circuit 33 is respectively electrically connected to the third input node P13, the second input node P12 and the input clock signal terminal KI, and is configured to write the input clock signal into the second input node P12 under the control of the potential of the third input node P13, and control the potential of the second input node P12 according to the potential of the third input node P13; the input clock signal terminal KI is used to provide the input clock signal;

The second node control sub-circuit 34 is respectively electrically connected to the input clock signal terminal KI, the second input node P12, the second node P2, the first isolation node P31, the third voltage terminal V3 and the second node P2, and is configured to connect or disconnect the second input node P12 and the second node P2 under the control of the input clock signal, and write the third voltage signal into the second node P2 under the control of the potential of the first isolation node P31.

The difference between at least one embodiment of the gate driving unit shown in FIG. 13 of the present disclosure and at least one embodiment of the gate driving unit shown in FIG. 9 of the present disclosure is as follows: the first input node control circuit includes a first isolation node control sub-circuit 41 and the first isolation sub-circuit 42, the third input node control sub-circuit 32 is electrically connected to the first isolation node P31 instead of the first input node.

Figure 14:
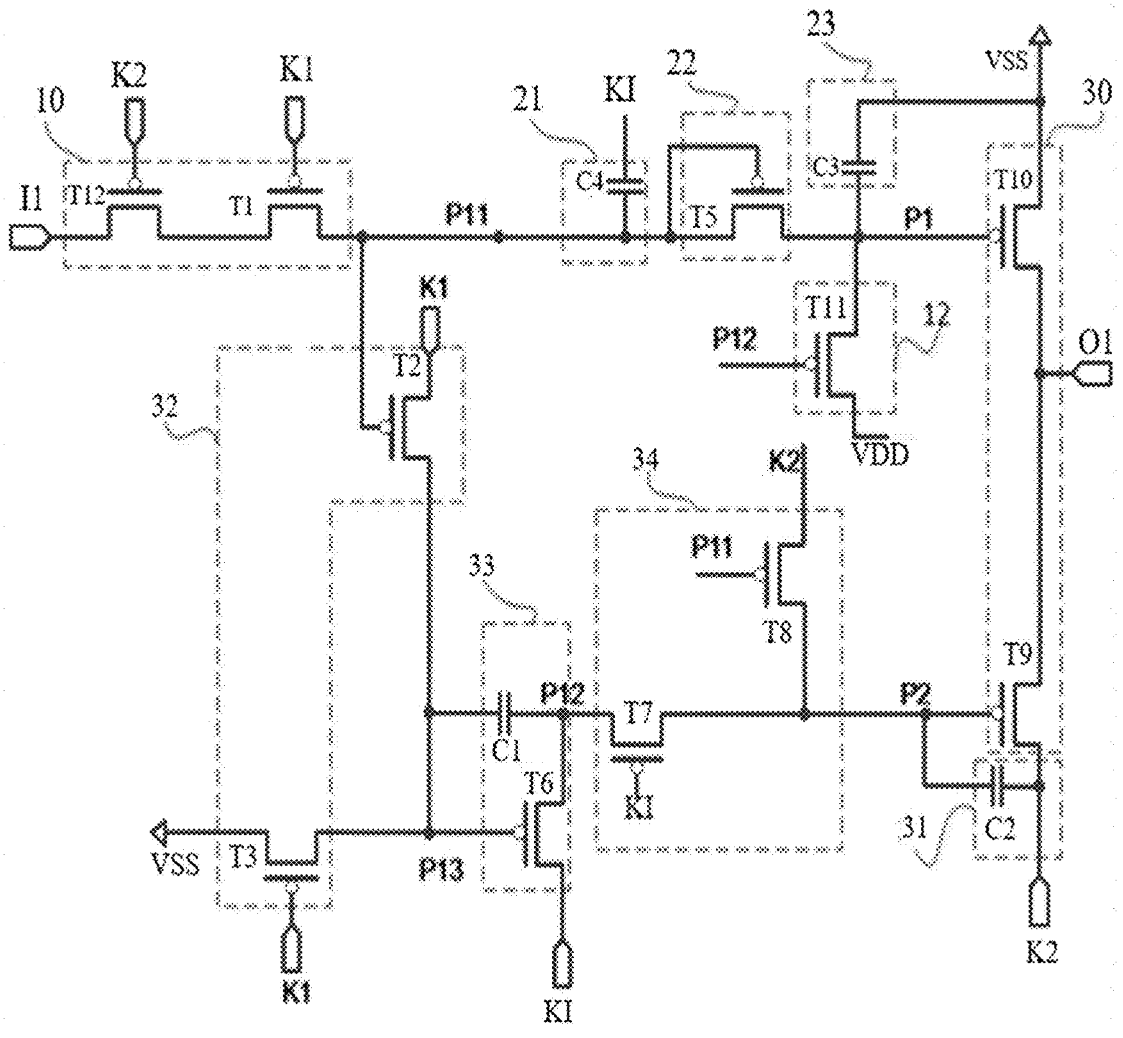
FIG. 14 is a circuit diagram of the gate driving unit according to at least one embodiment of the present disclosure.

As shown in FIG. 14, on the basis of at least one embodiment of the gate driving unit shown in FIG. 6, in at least one embodiment of the gate driving unit described in the present disclosure, The first input node control circuit 10 includes a first control transistor T12 and a second control transistor T1, wherein, A gate electrode of the first control transistor T12 is electrically connected to the second clock signal terminal K2, and a source electrode of the first control transistor T12 is electrically connected to the input terminal;

A gate electrode of the second control transistor T1 is electrically connected to the first clock signal terminal K1, a source electrode of the second control transistor T1 is electrically connected to a drain electrode of the first control transistor T12, and a drain electrode of the second control transistor T1 is electrically connected to the first input node P11;

The input energy storage sub-circuit 21 includes an input capacitor C4, the on-off control sub-circuit 22 includes an on-off control transistor T5, and the first energy storage sub-circuit 23 includes a first storage capacitor C3; the first end of C4 is electrically connected to the input clock signal terminal KI, and the second end of C4 is electrically connected to the first input node P11;

A gate electrode of T5 and a source electrode of T5 are both electrically connected to the first input node P11, and a drain electrode of T5 is electrically connected to the first node P1;

The first end of C3 is electrically connected to the first node P1, and the second end of C3 is electrically connected to the low voltage terminal; the low voltage terminal is used to provide the low voltage VSS;

The first node control circuit 12 includes a first node control transistor T11;

A gate electrode of T11 is electrically connected to the second input node P12, a source electrode of T11 is electrically connected to the high voltage terminal, and a drain electrode of T11 is electrically connected to the first node P1; the high voltage terminal is used to provide a high voltage VDD;

The first energy storage circuit 31 includes a second storage capacitor C2;

The first end of C2 is electrically connected to the second node P2, and the second end of C2 is electrically connected to the second clock signal output terminal K2;

The output circuit 30 includes a first output transistor T10 and a second output transistor T9;

A gate electrode of the first output transistor T10 is electrically connected to the first node P1, a source electrode of the first output transistor T10 is electrically connected to the low voltage terminal, and a drain electrode of the first output transistor T10 is electrically connected to the gate driving signal output terminal O1;

A gate electrode of the second output transistor T9 is electrically connected to the second node P2, a source electrode of the second output transistor T9 is electrically connected to the gate driving signal output terminal O1, and a second electrode of the second output transistor T9 is electrically connected to the second clock signal terminal K2;

The third input node control sub-circuit 32 includes a third control transistor T3 and a fourth control transistor T2, wherein, A gate electrode of T3 is electrically connected to the first clock signal terminal K1, a source electrode of T3 is electrically connected to the low voltage terminal, and a drain electrode of T3 is electrically connected to the third input node P13;

A gate electrode of T2 is electrically connected to the first input node P11, a source electrode of T2 is electrically connected to the first clock signal terminal K1, and a drain electrode of T2 is electrically connected to the third input node P13;

The second input node control sub-circuit 33 includes a fifth control transistor T6 and a first capacitor C1;

A gate electrode of T6 is electrically connected to the third input node P13, a source electrode of the eighth control transistor T6 is electrically connected to the second input node P12, and a drain electrode of the eighth control transistor T6 is connected to the input clock signal Terminal KI;

The first end of the first capacitor C1 is electrically connected to the third input node P13, and the second end of the first capacitor C1 is electrically connected to the second input node P12;

The second node control sub-circuit 34 includes a sixth control transistor T7 and a seventh control transistor T8;

A gate electrode of T7 is electrically connected to the input clock signal terminal KI, a source electrode of T7 is electrically connected to the second input node P12, and a drain electrode of T7 is electrically connected to the second node P2;

A gate electrode of T8 is electrically connected to the first input node P11, a source electrode of T8 is electrically connected to the second clock signal terminal K2, and a drain electrode of T8 is electrically connected to the second node P2.

In at least one embodiment shown in FIG. 14, all transistors are p-type thin film transistors, the first voltage signal is a negative voltage signal, the second voltage terminal is a low voltage terminal, the third voltage terminal is a high voltage terminal, and the output voltage terminal is a low voltage terminal, but not limited thereto.

In at least one embodiment shown in FIG. 14, the ratio of the capacitance value of C4 to the capacitance value of C1 may be greater than or equal to 1 and less than or equal to 10, but not limited thereto.

When the gate driving unit according to at least one embodiment of the present disclosure is in operation, the potential of P1 is related to the capacitance value of C3, the capacitance value of C4, the parasitic capacitance of T13, the parasitic capacitance of T4, and the parasitic capacitance of T5, rather than the ratio of the capacitance value of C4 to the capacitance value of C3. By increasing the capacitance value of C4, the potential of P1 will be reduced, but the potential of P1 will not be reduced indefinitely.

Figure 15:
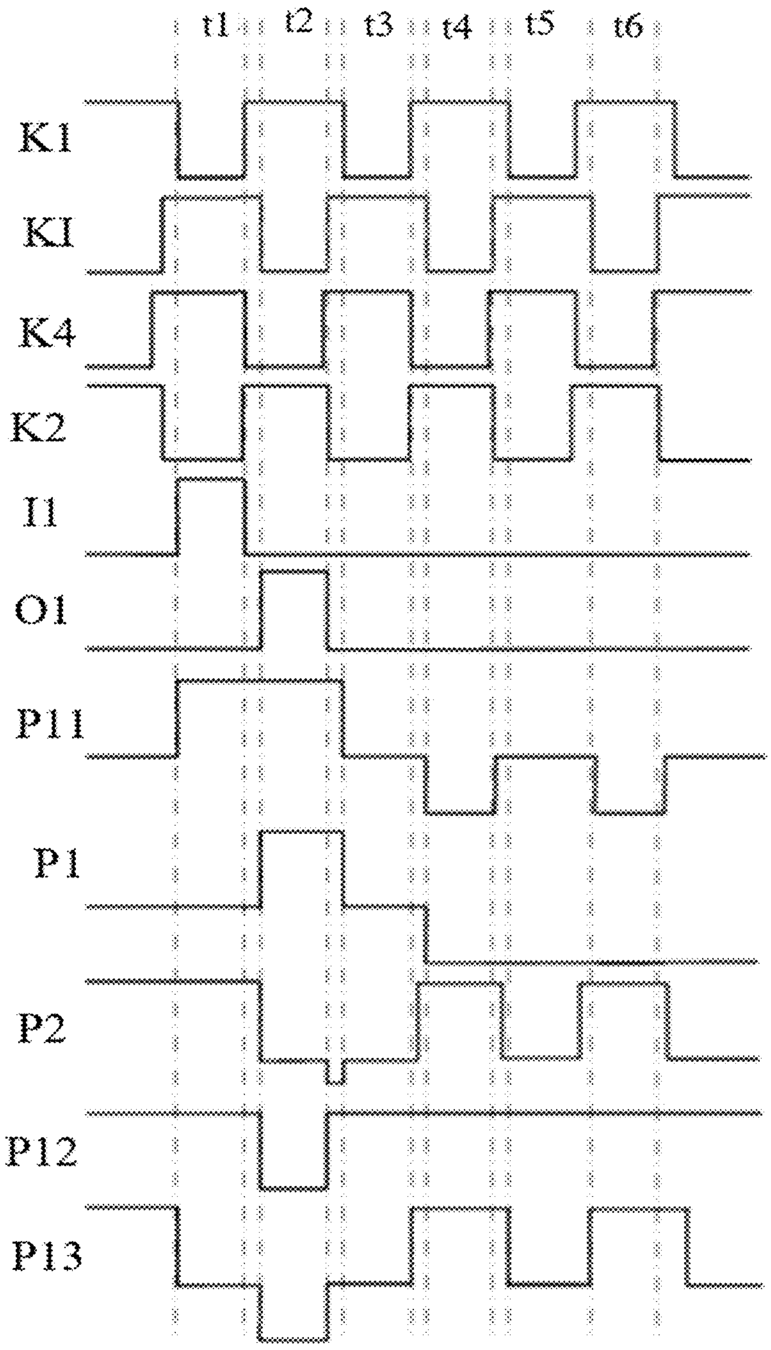
FIG. 15 is a timing diagram of the gate driving unit as shown in FIG. 14 according to at least one embodiment of the present disclosure.

As shown in FIG. 15, when at least one embodiment of the gate driving unit shown in FIG. 14 is in operation, In the input phase t1, K1 provides a low voltage, KI provides a high voltage, K2 provides a low voltage, I1 provides a high voltage, T12 and T1 are turned on, the potential of P11 is a high voltage, T5 is turned off; T2 is turned off, T3 is turned on, and the potential of P13 is a low voltage, T6 is turned on, the potential of P12 is a high voltage, T7 is turned off, T8 is turned off, T11 is turned off, the potential of P1 is maintained at a low voltage, the potential of P2 is maintained at a high voltage, T10 is turned on, T9 is turned off, and O1 outputs a low voltage;

In the output phase t2, K1 provides a high voltage, KI provides a low voltage, K2 provides a high voltage, I1 provides a low voltage, both T12 and T1 are turned off, the potential of P11 is maintained at a high voltage, T5 is turned off, and the potential of P13 is further pulled down by C1, T6 is turned on, the potential of P12 is a low voltage, T7 is turned on, T8 is turned off, T11 is turned on, the potential of P1 is a high voltage, the potential of P2 is a low voltage, T9 is turned on, T10 is turned off, O1 outputs a high voltage;

In the reset phase t3, K1 provides a low voltage, KI provides a high voltage, K2 provides a low voltage, I1 provides a low voltage, both T12 and T1 are turned on, the potential of P11 is pulled down, T5 is turned on, and the potential of P1 is pulled down; T10 is turned on; and at this time, T8 is turned on, and the potential of P2 is pulled down by the second clock signal provided by K2, and T9 is also turned on the output terminal of the gate driving signal is discharged through T9 and T10 at the same time, which can improve the discharge speed of the output terminal of the gate driving signal, so as to achieve a complete and fast reset of the gate driving signal;

In a first maintenance phase t4 included in the maintenance phase, K1 provides a high voltage, KI provides a low voltage, K2 provides a high voltage, I1 provides a low voltage, both T12 and T1 are turned off, KI pulls down the potential of P11 through C4, and T5 is turned on, so that the potential of P1 is kept lower than VSS+Vth, and Vth is the threshold voltage of T10, T10 is turned on, the potential of the gate driving signal outputted by O1 is maintained at VSS, which is not affected by noise interference; T3 is turned off, and T2 is turned on, the potential of P13 is a high voltage, T6 is turned off, the potential of P12 is a high voltage, T7 is turned on, the potential of P2 is a high voltage, and T9 is turned off;

In a second maintenance phase t5 included in the maintenance phase, K1 provides a low voltage, KI provides a high voltage, K2 provides a low voltage, I1 provides a low voltage, both T12 and T1 are turned on, and the potential of the input clock signal provided by KI is increased, thereby pulling up the potential of P11, T5 is turned off, the potential of P1 is not affected, so that the potential of P1 is kept lower than VSS+Vth, Vth is the threshold voltage of T10, T10 is turned on, and the potential of the gate driving signal outputted by O1 is maintained at VSS and is not affected by noise interference; T3 is turned on, the potential of P13 is a low voltage, T6 is turned on, the potential of P12 is a high voltage, T7 is turned off, T8 is turned off, the potential of P2 is pulled down by the second clock signal, and T9 is turned on;

In a third maintenance period t6 included in the maintenance phase, K1 provides a high voltage, KI provides a low voltage, K2 provides a high voltage, I1 provides a low voltage, both T12 and T1 are turned off, KI pulls down the potential of P11 through C4, and T5 is turned on, the potential of P1 is kept lower than VSS+Vth, and Vth is the threshold voltage of T10, T10 is turned on, the potential of the gate driving signal outputted by O1 is maintained at VSS, which is not affected by noise interference; T3 is turned off, and T2 is turned on, the potential of P13 is a high voltage, T6 is turned off, the potential of P12 is a high voltage, T7 is turned on, T8 is turned on, the potential of P2 is a high voltage, and T9 is turned off;

In the maintenance phase, the potential of P1 can be maintained to be less than VSS+Vth, Vth is the threshold voltage of T10, so that T10 is turned on, and the potential of the gate driving signal outputted by O1 is maintained at VSS, which is not affected by noise interference.

In at least one embodiment of the gate driving unit shown in FIGS. 14, C4, T5 and C3 form a charge pump structure, and the charge pump is a structure similar to a water pump in the circuit, mainly to realize the redistribution of charges and achieve the purpose of voltage increasing (or decreasing) through a rectification structure of a capacitor, a clock signal and a diode (In FIG. 7, T5 is connected by a diode way).

When at least one embodiment of the gate driving unit shown in FIG. 14 is in operation, the potential of the input signal provided by I1 is a low voltage, T1 and T12 are used to initialize the potential of P11 so that the potential of P11 is VSS, and C4 is used to further pull down the potential of P11 at the falling edge of the input clock signal, the low voltage is stored to P1 through T5, and the charge is stored through C3 to maintain the potential;

In the maintenance phase, when the potential of the input clock signal is increased, the potential of P11 is pulled up, and T5 is turned off, which does not affect the potential of P1; when the potential of the first clock signal and the potential of the second clock signal are low voltages, the excess charge is stored into the input terminal I1 through T1 and T12, and the above process is repeated.

In at least one embodiment of the present disclosure, a fourth clock signal is provided by a fourth clock signal terminal labeled K4.

Figure 16:
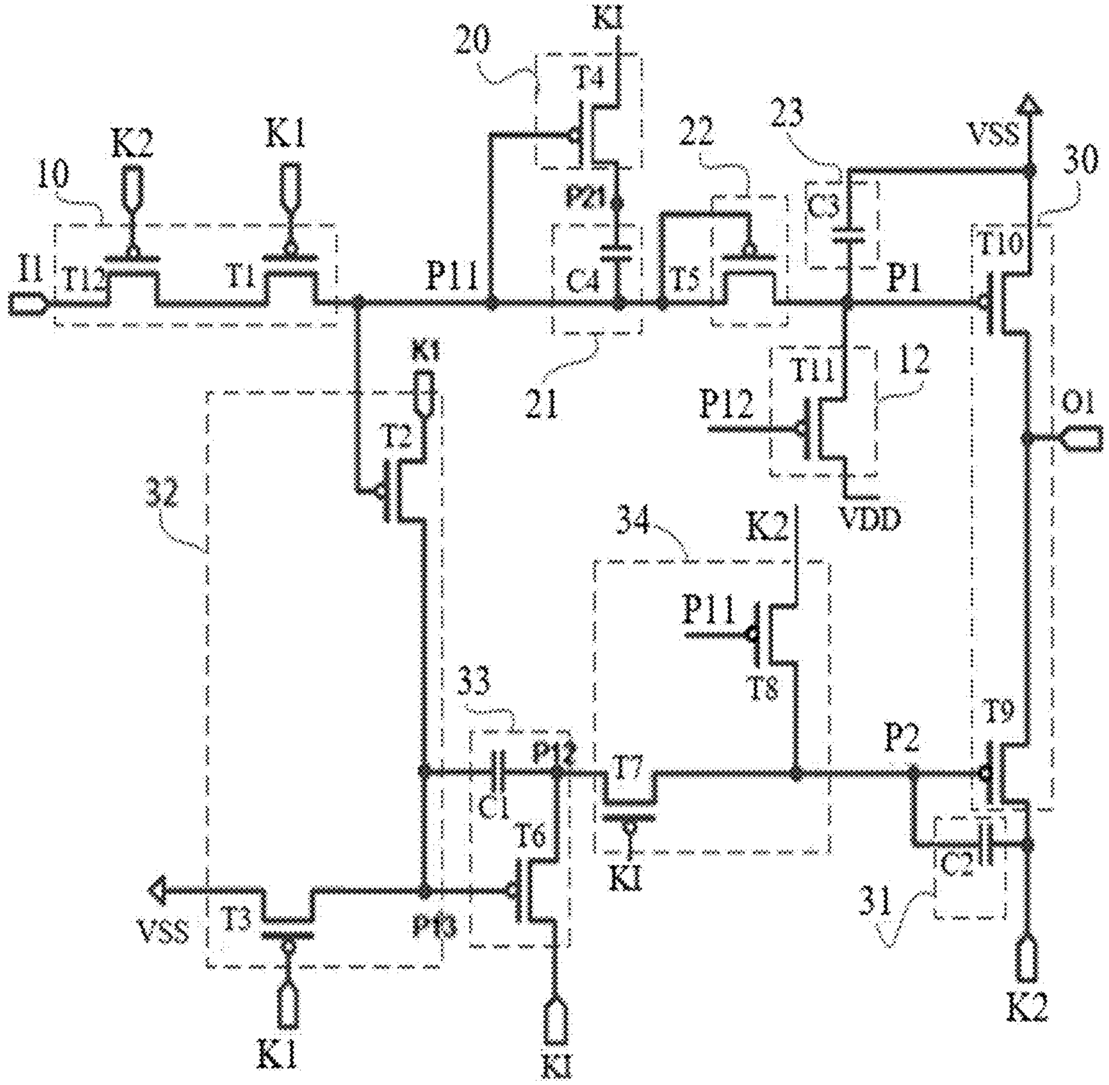
FIG. 16 is a circuit diagram of the gate driving unit according to at least one embodiment of the present disclosure.

As shown in FIG. 16, on the basis of at least one embodiment of the gate driving circuit shown in FIG. 14, in at least one embodiment of the gate driving circuit described in the present disclosure, the charge pump circuit further includes a switch control sub-circuit 20; The switch control sub-circuit 20 includes a switch control transistor T4;

A gate electrode of T4 is electrically connected to the first input node P11, a source electrode of T4 is electrically connected to the input clock signal terminal KI, and a drain electrode of T4 is electrically connected to the first control node P21;

The first control node P21 is electrically connected to the first end of C4.

In at least one embodiment of the gate driving circuit shown in FIG. 16, T4 is a p-type thin film transistor, but not limited thereto.

As shown in FIG. 15, when at least one embodiment of the gate driving unit shown in FIG. 16 is in operation, In the input phase t1, K1 provides a low voltage, KI provides a high voltage, K2 provides a low voltage, I1 provides a high voltage, T12 and T1 are turned on, the potential of P11 is a high voltage, and both T5 and T4 are turned off; T2 is turned off, and T3 is turned on, the potential of P13 is a low voltage, T6 is turned on, the potential of P12 is a high voltage, T7 is turned off, T8 is turned off, T11 is turned off, the potential of P1 is maintained at a low voltage, the potential of P2 is maintained at a high voltage, T10 is turned on, T9 is turned off, O1 output a low voltage;

In the output phase t2, K1 provides a high voltage, KI provides a low voltage, K2 provides a high voltage, I1 provides a low voltage, both T12 and T1 are turned off, the potential of P11 is maintained at a high voltage, T4 is turned off, T5 is turned off, and the potential of P13 is further pulled down by C1, T6 is turned on, the potential of P12 is a low voltage, T7 is turned on, T8 is turned off, T11 is turned on, the potential of P1 is a high voltage, the potential of P2 is a low voltage, T9 is turned on, T10 is turned off, and O1 outputs a high voltage;

In the reset phase t3, K1 provides a low voltage, KI provides a high voltage, K2 provides a low voltage, I1 provides a low voltage, both T12 and T1 are turned on, the potential of P11 is pulled down, T5 is turned on, and the potential of P1 is pulled down; T10 is turned on; T8 is turned on, and the potential of P2 is pulled down by the second clock signal provided by K2, and T9 is also turned on the output terminal of the gate driving signal is discharged through T9 and T10 at the same time, which can improve the discharge speed of the output terminal of the gate driving signal, so as to achieve a complete and fast reset of the gate driving signal;

In the first maintenance phase t4 included in the maintenance phase, K1 provides a high voltage, KI provides a low voltage, K2 provides a high voltage, I1 provides a low voltage, both T12 and T1 are turned off, T4 is turned on, and KI pulls down the potential of P11 through C4, T5 is turned on, so that the potential of P1 is maintained less than VSS+Vth, and Vth is the threshold voltage of T10, so that T10 is turned on, the potential of the gate driving signal outputted by O1 is maintained at VSS, which is not affected by noise interference; T3 is turned off, T2 is turned on, the potential of P13 is a high voltage, T6 is turned off, the potential of P12 is a high voltage, T7 is turned on, the potential of P2 is a high voltage, and T9 is turned off;

In the second maintenance phase t5 included in the maintenance phase, K1 provides a low voltage, KI provides a high voltage, K2 provides a low voltage, I1 provides a low voltage, both T12 and T1 are turned on, T4 is turned on, and the potential of the input clock signal provided by KI is increased, so that the potential of P11 is pulled up, T5 is turned off, and the potential of P1 is not affected, so that the potential of P1 is maintained less than VSS+Vth, Vth is the threshold voltage of T10, so that T10 is turned on, and then the potential of the gate driving signal outputted by O1 is maintained at VSS, which is not affected by noise interference; T3 is turned on, the potential of P13 is a low voltage, T6 is turned on, the potential of P12 is a high voltage, T7 is turned off, T8 is turned off, and the potential of P2 is pulled down by the second clock signal, T9 is turned on;

In the third maintenance phase t6 included in the maintenance phase, K1 provides a high voltage, KI provides a low voltage, K2 provides a high voltage, I1 provides a low voltage, both T12 and T1 are turned off, T4 is turned on, and KI pulls down the potential of P11 through C4, T5 is turned on, so that the potential of P1 is maintained less than VSS+Vth, and Vth is the threshold voltage of T10, so that T10 is turned on, the potential of the gate driving signal output by O1 is maintained at VSS, which is not affected by noise interference; T3 is turned off, T2 is turned on, the potential of P13 is a high voltage, T6 is turned off, the potential of P12 is a high voltage, T7 is turned on, T8 is turned on, the potential of P2 is a high voltage, and T9 is turned off;

In the maintenance phase, the potential of P1 can be maintained less than VSS+Vth, Vth is the threshold voltage of T10, so that T10 is turned on, and the potential of the gate driving signal outputted by O1 is maintained at VSS, which is not affected by noise interference.

In at least one embodiment of the gate driving unit shown in FIGS. 16, T4, C4, T5 and C3 form a charge pump structure, and the charge pump is a structure similar to a water pump in the circuit, which is mainly to realize the redistribution of charges and achieve the purpose of voltage increasing (or decreasing) through a rectification structure of a capacitor, a clock signal and a diode (In FIG. 12, T5 is connected by a diode way).

When at least one embodiment of the gate driving unit shown in FIG. 16 is in operation, the potential of the input signal provided by I1 is a low voltage, T1 and T12 are used to initialize the potential of P11 so that the potential of P11 is VSS, and C4 is used to further pull down the potential of P11 at the falling edge of the input clock signal, the low voltage is stored to P1 through T5, and the charge is stored through C3 to maintain the potential;

In the maintenance phase, when the potential of the input clock signal is increased, the potential of P11 is pulled up, and T5 is turned off, which does not affect the potential of P1; when the potential of the first clock signal and the potential of the second clock signal are low voltages, the excess charge is stored into the input terminal I1 through T1 and T12, and the above process is repeated.

Figure 17:
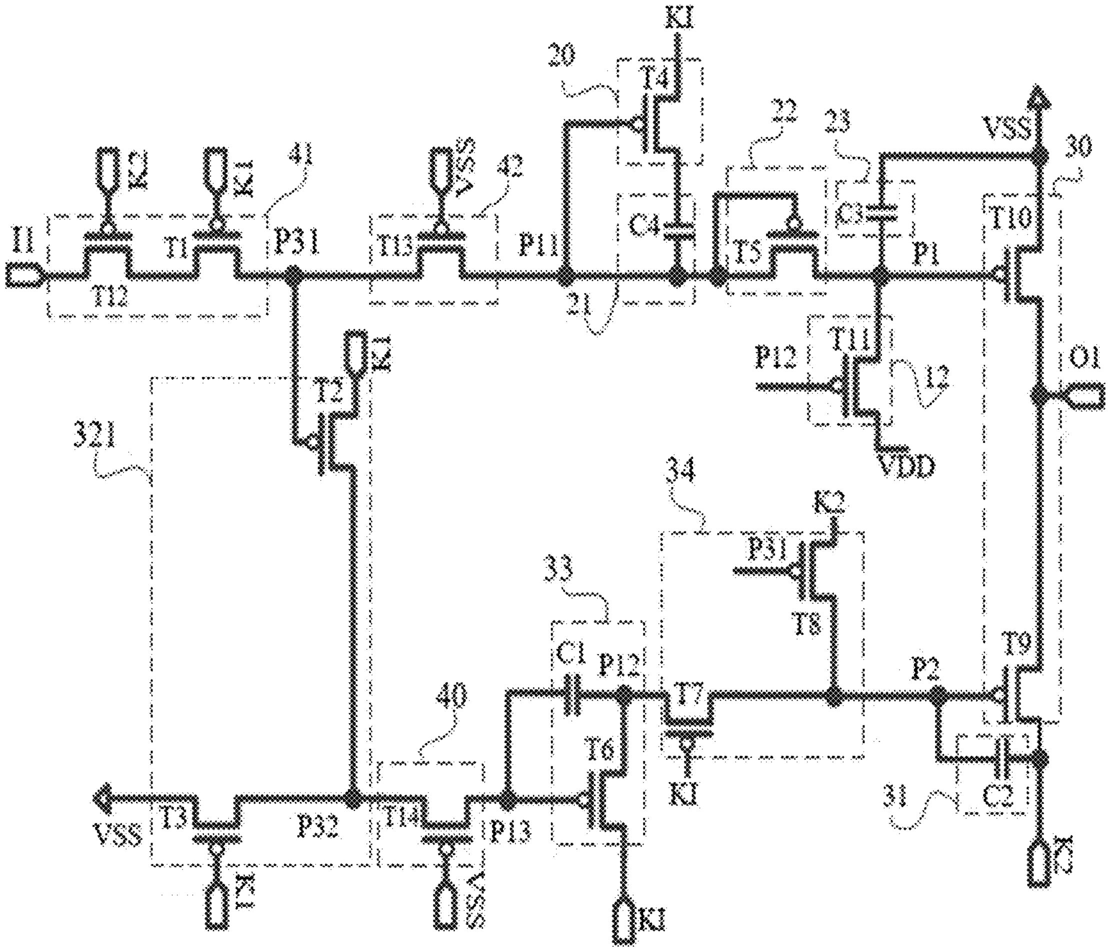
FIG. 17 is a circuit diagram of the gate driving unit according to at least one embodiment of the present disclosure.

As shown in FIG. 17, on the basis of at least one embodiment of the gate driving unit shown in FIG. 10, in at least one embodiment of the gate driving unit described in the present disclosure, The charge pump circuit further includes a switch control sub-circuit 20; the switch control sub-circuit 20 includes a switch control transistor T4;

The first isolation node control sub-circuit 41 includes a first control transistor T12 and a second control transistor T1, wherein, A gate electrode of the first control transistor T12 is electrically connected to the second clock signal terminal K2, and a source electrode of the first control transistor T12 is electrically connected to the input terminal;

A gate electrode of the second control transistor T1 is electrically connected to the first clock signal terminal K1, a source electrode of the second control transistor T1 is electrically connected to the drain electrode of the first control transistor T12, and a drain electrode of the second control transistor T1 is electrically connected to the first isolation node P31;

The first isolation sub-circuit 42 includes a first isolation transistor T13;

A gate electrode of T13 is electrically connected to the low voltage terminal, a source electrode of T13 is electrically connected to the first isolation node P31, and a drain electrode of T13 is electrically connected to the first input node P11; the low voltage terminal is used to provide the low voltage VSS;

The input energy storage sub-circuit 21 includes an input capacitor C4, the on-off control sub-circuit 22 includes an on-off control transistor T5, and the first energy storage sub-circuit 23 includes a first storage capacitor C3;

The gate electrode of T4 is electrically connected to the first input node P11, the source electrode of T4 is electrically connected to the input clock signal terminal KI, and the drain electrode of T4 is electrically connected to the first control node P21;

The first control node P21 is electrically connected to the first end of C4, the second end of C4 is electrically connected to the first input node P11; the gate electrode of T5 and the source electrode of T5 are both connected to the first input node P11, the drain electrode of T5 is electrically connected to the first node P1;

The first end of C3 is electrically connected to the first node P1, and the second end of C3 is electrically connected to the low voltage terminal; the low voltage terminal is used to provide the low voltage VSS;

The first node control circuit 12 includes a first node control transistor T11;

The gate electrode of T11 is electrically connected to the second input node P12, the source electrode of T11 is electrically connected to the high voltage terminal, and the drain electrode of T11 is electrically connected to the first node P1; the high voltage terminal is used to provide a high voltage VDD;

The first energy storage circuit 31 includes a second storage capacitor C2;

The first end of C2 is electrically connected to the second node P2, and the second end of C2 is electrically connected to the second clock signal output end K2;

The output circuit 30 includes a first output transistor T10 and a second output transistor T9;

The gate electrode of the first output transistor T10 is electrically connected to the first node P1, the source electrode of the first output transistor T10 is electrically connected to the low voltage terminal, and the drain electrode of the first output transistor T10 is electrically connected to gate driving signal output terminal O1;

The gate electrode of the second output transistor T9 is electrically connected to the second node P2, the source electrode of the second output transistor T9 is electrically connected to the gate driving signal output terminal O1, and the second electrode of the second output transistor T9 is electrically connected to the second clock signal terminal K2;

The third input node control sub-circuit includes a third isolation node control sub-circuit 321 and a second isolation sub-circuit 40; the third isolation node control sub-circuit 321 includes a third control transistor T3 and a fourth control transistor T2; the second isolation sub-circuit 40 includes a second isolation transistor T14, wherein, The gate electrode of T3 is electrically connected to the first clock signal terminal K1, the source electrode of T3 is electrically connected to the low voltage terminal, and the drain electrode of T3 is electrically connected to the second isolation node P32;

The gate electrode of T2 is electrically connected to the first isolation node P31, the source electrode of T2 is electrically connected to the first clock signal terminal K1, and the drain electrode of T2 is electrically connected to the second isolation node P32;

The gate electrode of T14 is electrically connected to the low voltage terminal, the source electrode of T14 is electrically connected to the second isolation node P32, and the drain electrode of T14 is electrically connected to the third input node P13;

The second input node control sub-circuit 33 includes a fifth control transistor T6 and a first capacitor C1;

The gate electrode of T6 is electrically connected to the third input node P13, the source electrode of the eighth control transistor T6 is electrically connected to the second input node P12, and the drain electrode of the eighth control transistor T6 is connected to the input clock signal terminal KI;

The first end of the first capacitor C1 is electrically connected to the third input node P13, and the second end of the first capacitor C1 is electrically connected to the second input node P12;

The second node control sub-circuit 34 includes a sixth control transistor T7 and a seventh control transistor T8;

The gate electrode of T7 is electrically connected to the input clock signal terminal KI, the source electrode of T7 is electrically connected to the second input node P12, and the drain electrode of T7 is electrically connected to the second node P2;

The gate electrode of T8 is electrically connected to the first isolation node P31, the source electrode of T8 is electrically connected to the second clock signal terminal K2, and the drain electrode of T8 is electrically connected to the second node P2.

In at least one embodiment shown in FIG. 17, the ratio of the capacitance value of C4 to the capacitance value of C1 may be greater than or equal to 1 and less than or equal to 10, but not limited thereto.

In at least one embodiment shown in FIG. 17, all transistors are p-type thin film transistors, the first voltage signal is a negative voltage signal, the second voltage terminal is a low voltage terminal, the third voltage terminal is a high voltage terminal, and the output voltage terminal is a low voltage terminal, but not limited thereto.

In at least one embodiment shown in FIG. 17, T7 can prevent current leakage of the third input node P13, and isolate the influence of C1 on the second node P2, so as to enhance the coupling effect of the second clock signal provided by the second clock signal terminal K2 on the second node P2, so that when the potential of the second clock signal is decreased, the potential of the second node P2 may be lower, thereby accelerating the discharge speed of the second output transistor T9 to the gate driving signal output terminal O1.

The difference between at least one embodiment of the gate driving unit shown in FIG. 17 and at least one embodiment of the gate driving unit shown in FIG. 14 is that a first isolation transistor T13 and a second isolation transistor T14 are added;

T13 can reduce the current leakage of P11, and T14 can reduce the current leakage of P13, so that the response speed of the gate driving signal output terminal is faster.

Figure 18:
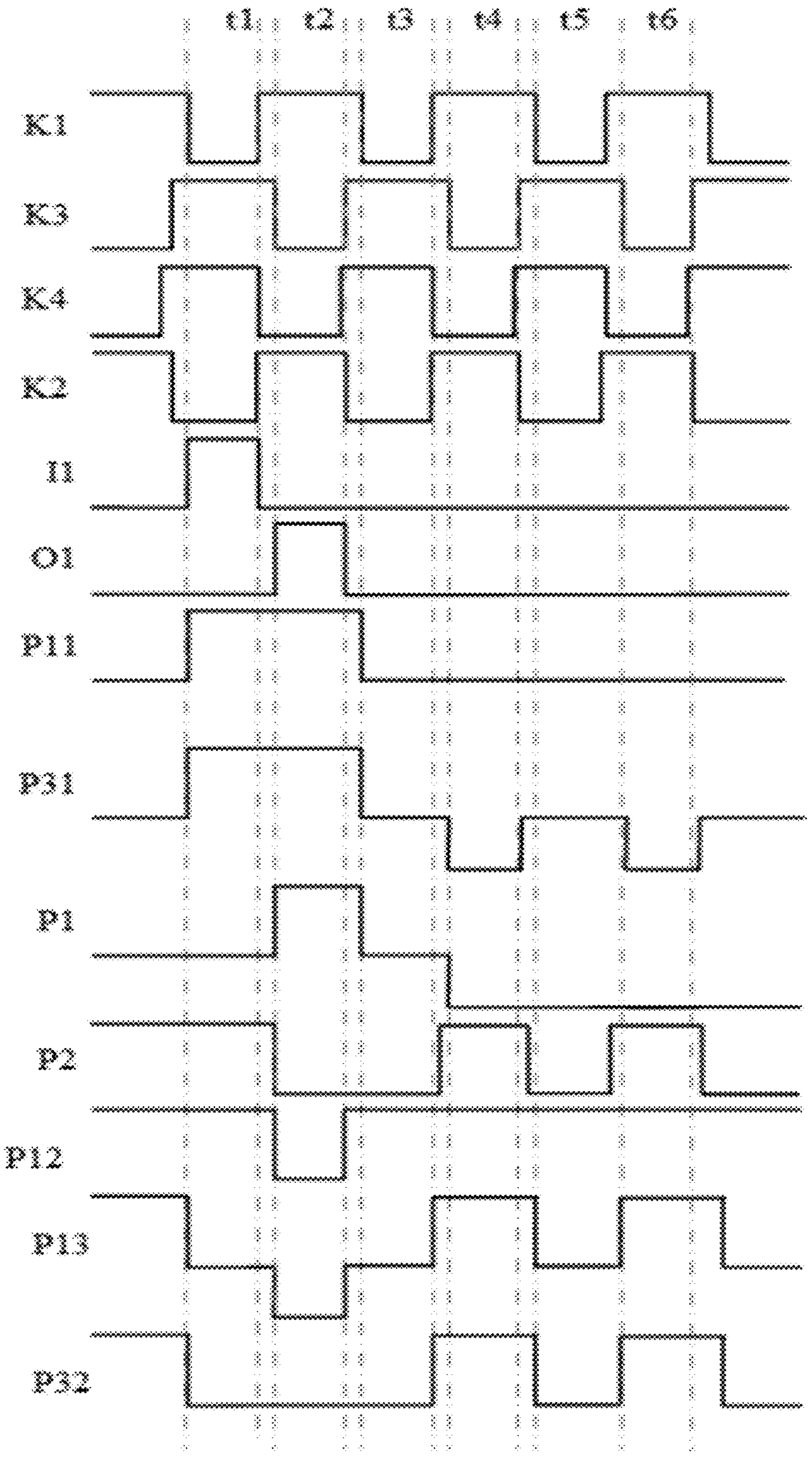
FIG. 18 is a timing diagram of the gate driving unit as shown in FIG. 17 according to at least one embodiment of the present disclosure.

As shown in FIG. 18, when at least one embodiment of the gate driving unit shown in FIG. 17 of the present disclosure is in operation, In the input phase t1, K1 provides a low voltage, KI provides a high voltage, K2 provides a low voltage, I1 provides a high voltage, T12 and T1 are turned on, T13 is turned on, the potential of P11 is a high voltage, the potential of P31 is a high voltage, T5 and T4 are turned off; T2 is turned off, T3 is turned on, T14 is turned on, the potential of P32 is a low voltage, the potential of P13 is a low voltage, T6 is turned on, the potential of P12 is a high voltage, T7 is turned off, T8 is turned off, T11 is turned off, and the potential of P1 is maintained at a low voltage, the potential of P2 is maintained at a high voltage, T10 is turned on, T9 is turned off, and O1 outputs a low voltage;

In the output phase t2, K1 provides a high voltage, KI provides a low voltage, K2 provides a high voltage, I1 provides a low voltage, both T12 and T1 are turned off, the potential of P11 is maintained at high voltage, T13 is turned on, and the potential of P31 is a high voltage; T4 is turned off, T5 is turned off, the potential of P32 is maintained at a low voltage, T14 is turned from on to off, the potential of P13 is further pulled down by C1, T6 is turned on, the potential of P12 is a low voltage, T7 is turned on, T8 is turned off, T11 is turned on, the potential of P1 is a high voltage, the potential of P2 is a low voltage, T9 is turned on, T10 is turned off, and O1 outputs a high voltage;

In the reset phase t3, K1 provides a low voltage, KI provides a high voltage, K2 provides a low voltage, I1 provides a low voltage, both T12 and T1 are turned on, the potential of P11 is pulled down, T13 is turned on, the potential of P31 is pulled down, and T5 is turned on, the potential of P1 is pulled down; T10 is turned on; T3 is turned on, the potential of P32 is a low voltage, T14 is turned on, the potential of P13 and P12 are pulled up, and T7 is turned off; and at this time, T8 is turned on, and the potential of P2 is pulled down by the second clock signal provided by K2, and T9 is also turned on. The gate driving signal output terminal is discharged through T9 and T10 at the same time, the discharge speed of the gate driving signal output terminal can be improved, so as to realize the complete and fast reset of the gate driving signal;

In the first maintenance phase t4 included in the maintenance phase, K1 provides a high voltage, KI provides a low voltage, K2 provides a high voltage, I1 provides a low voltage, both T12 and T1 are turned off, the potential of P11 is maintained at a low voltage, and T13 is turned from on to off, T4 is turned on, KI pulls down the potential of P31 through C4, and T5 is turned on, so that the potential of P1 is maintained less than VSS+Vth, Vth is the threshold voltage of T10, so that T10 is turned on, the potential of the gate driving signal outputted by O1 is maintained at VSS and is not affected by noise interference; T3 is turned off, T2 is turned on, the potential of P32 is a high voltage, T14 is turned on, the potential of P13 is a high voltage, the potential of P12 is a high voltage, T7 is turned on, T8 is turned on, the potential of P2 is a high voltage, and T9 is turned off;

In the second maintenance phase t5 included in the maintenance phase, K1 provides a low voltage, KI provides a high voltage, K2 provides a low voltage, I1 provides a low voltage, both T12 and T1 are turned on, the potential of P11 is a low voltage, T13 is turned on, and T4 is turned from on to off, the potential of the input clock signal provided by KI increases, thereby pulling up the potential of P31, and T5 is turned off, which does not affect the potential of P1, so that the potential of P1 is maintained less than VSS+Vth, and Vth is the threshold voltage of T10, so that T10 is turned on, and the potential of the gate driving signal outputted by O1 is maintained at VSS, which is not affected by noise interference; T3 is turned on, the potential of P32 is a low voltage, T2 is turned off, T14 is turned on, and the potential of P13 is a low voltage, T6 is turned on, the potential of P12 is a high voltage, T7 is turned off, T8 is turned off, the potential of P2 is pulled down by the second clock signal, and T9 is turned on;

In the third maintenance phase t6 included in the maintenance phase, K1 provides a high voltage, KI provides a low voltage, K2 provides a high voltage, I1 provides a low voltage, both T12 and T1 are turned off, the potential of P11 is maintained at a low voltage, T4 is turned on, and the potential of P31 is pulled down by KI through C4, and T5 is turned on, so that the potential of P1 is kept less than VSS+Vth, and Vth is the threshold voltage of T10, so that T10 is turned on, the potential of the gate driving signal outputted by O1 is maintained at VSS, which is not affected by noise interference; T3 is turned off, T2 is turned on, the potential of P32 is a high voltage, T14 is turned on, the potential of P13 is a high voltage, T6 is turned off, the potential of P12 is a high voltage, T7 is turned on, T8 is turned on, and the potential of P2 is a high voltage, T9 is turned off;

During the third maintenance phase t6, T13 is turned from on to off;

In the maintenance phase, the potential of P1 can be maintained less than VSS+Vth, Vth is the threshold voltage of T10, so that T10 is turned on, and the potential of the gate driving signal outputted by O1 is maintained at VSS, which is not affected by noise interference.

In at least one embodiment of the gate driving unit shown in FIGS. 17, T4, C4, T5 and C3 form a charge pump structure, and the charge pump is a structure similar to a water pump in the circuit, which is mainly to realize the redistribution of charges and achieve the purpose of voltage increasing (or decreasing) through a rectification structure of a capacitor, a clock signal and a diode (In FIG. 17, T5 is connected by a diode way).

Figure 19:
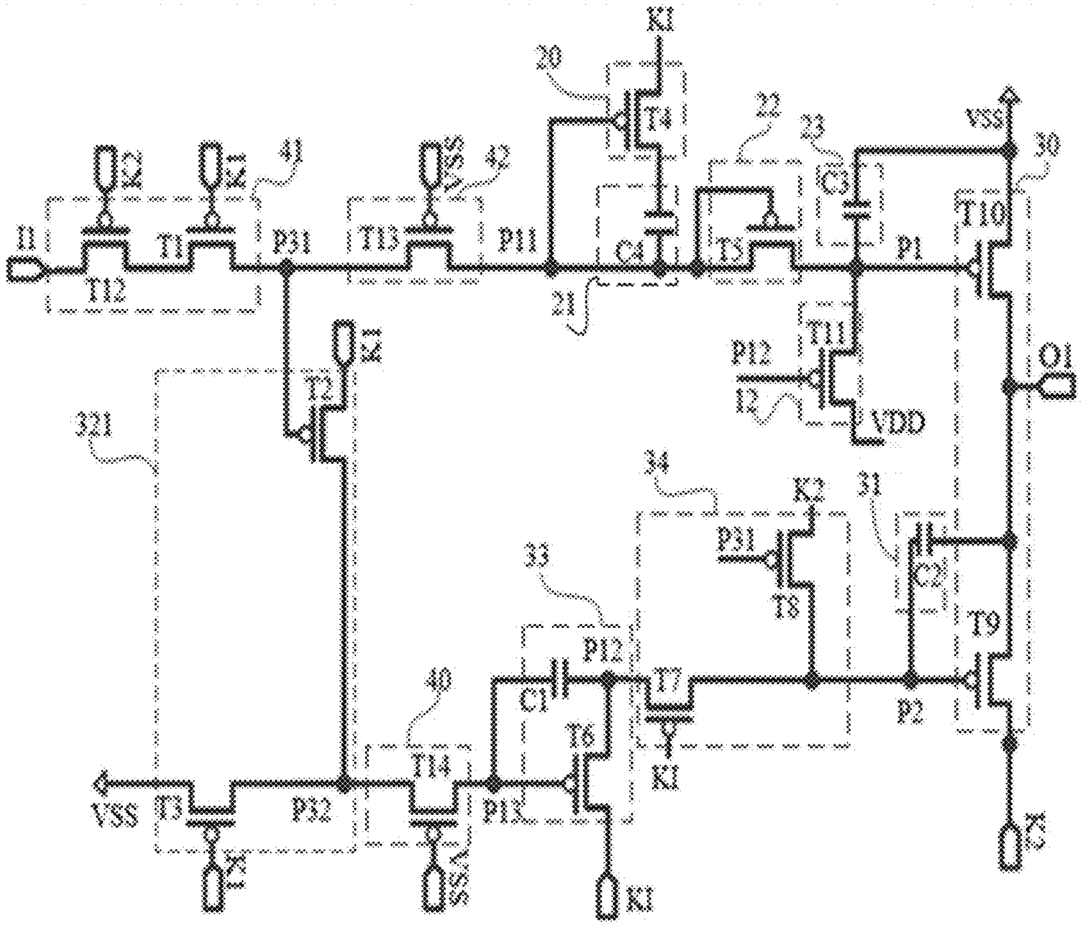
FIG. 19 is a circuit diagram of the gate driving unit according to at least one specific embodiment of the present disclosure.

As shown in FIG. 19, the difference between the at least one embodiment of the gate driving unit described in the present disclosure and the at least one embodiment of the gate driving unit shown in FIG. 17 of the present disclosure is:

The first end of C2 is electrically connected to the second node P2, and the second end of C2 is electrically connected to the gate driving signal output terminal O1.

In at least one embodiment shown in FIG. 19, the first voltage signal is a negative voltage signal, the second voltage terminal is a low voltage terminal, the third voltage terminal is a high voltage terminal, and the output voltage terminal is a low voltage terminal, which is not limited.

The difference between the fourth specific embodiment of the gate driving unit shown in FIG. 19 and the third specific embodiment of the gate driving unit shown in FIG. 17 of the present disclosure is that the second end of C2 is electrically connected to the gate driving signal output terminal O1, which reduces the capacitive load on the second clock signal terminal, is beneficial to reduce power consumption.

A timing diagram of at least one embodiment of the gate driving unit shown in FIG. 19 is shown in FIG. 18.

Figure 20:
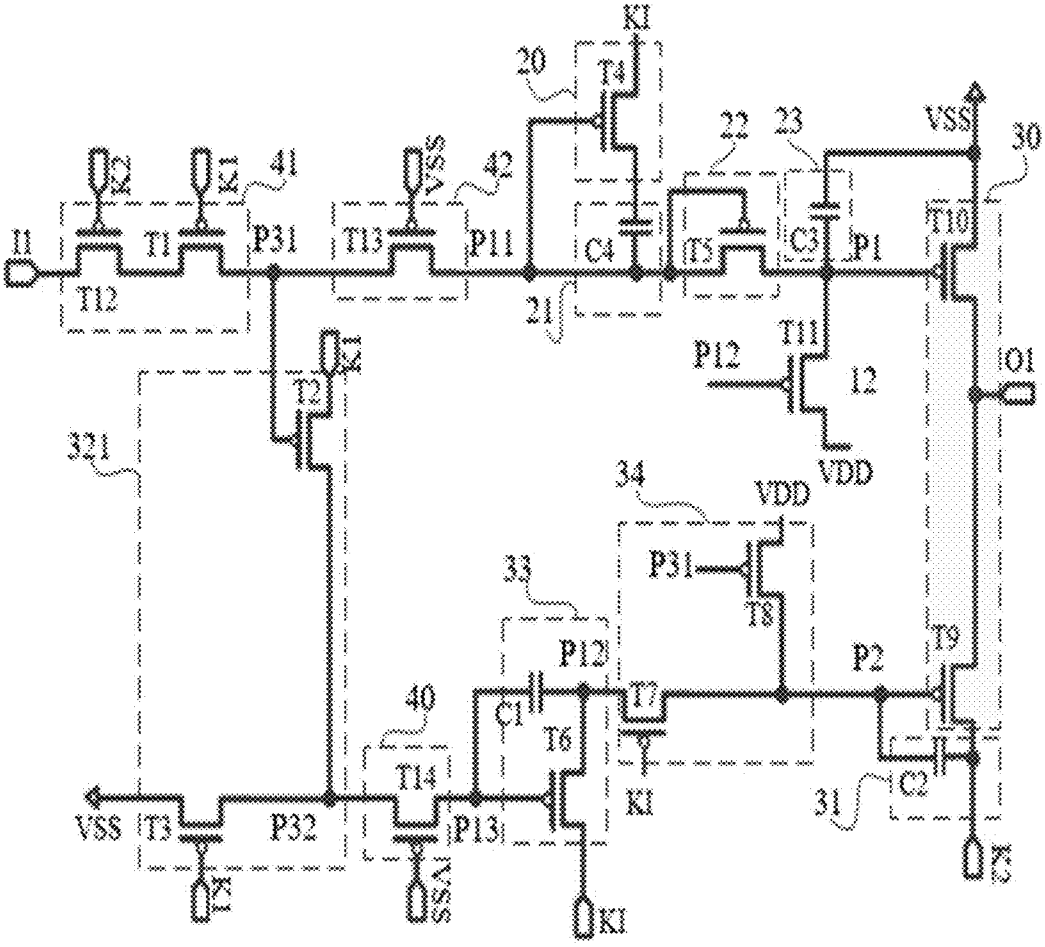
FIG. 20 is a circuit diagram of the gate driving unit according to at least one specific embodiment of the present disclosure.

As shown in FIG. 20, on the basis of at least one embodiment of the gate driving unit shown in FIG. 12, in at least one embodiment of the gate driving unit described in the present disclosure, the charge pump circuit further includes a switch control sub-circuit 20; the switch control sub-circuit 20 includes a switch control transistor T4;

The first isolation node control sub-circuit 41 includes a first control transistor T12 and a second control transistor T1, wherein, The gate electrode of the first control transistor T12 is electrically connected to the second clock signal terminal K2, and the source electrode of the first control transistor T12 is electrically connected to the input terminal;

The gate electrode of the second control transistor T1 is electrically connected to the first clock signal terminal K1, the source electrode of the second control transistor T1 is electrically connected to the drain electrode of the first control transistor T12, and the drain electrode of the second control transistor T1 is electrically connected to the first isolation node P31;

The first isolation sub-circuit 42 includes a first isolation transistor T13;

The gate electrode of the first isolation transistor T13 is electrically connected to the low voltage terminal, the source electrode of the first isolation transistor T13 is electrically connected to the first isolation node P31, and the drain electrode of the first isolation transistor T13 is electrically connected to the first input node P11; the low voltage terminal is used to provide the low voltage VSS;

The input energy storage sub-circuit 21 includes an input capacitor C4, the on-off control sub-circuit 22 includes an on-off control transistor T5, and the first energy storage sub-circuit 23 includes a first storage capacitor C3;

The gate electrode of T4 is electrically connected to the first input node P11, the source electrode of T4 is electrically connected to the input clock signal terminal KI, the drain electrode of T4 is electrically connected to the first end of C4; the second end of C4 is electrically connected to the first input node P11; the first end of C4 is electrically connected to the first control node P21;

The gate electrode of T5 and the source electrode of T5 are both electrically connected to the first input node P11, and the drain electrode of T5 is electrically connected to the first node P1;

The first end of C3 is electrically connected to the first node P1, and the second end of C3 is electrically connected to the low voltage terminal; the low voltage terminal is used to provide the low voltage VSS;

The first node control circuit 12 includes a first node control transistor T11;

The gate electrode of T11 is electrically connected to the second input node P12, the source electrode of T11 is electrically connected to the high voltage terminal, and the drain electrode of T11 is electrically connected to the first node P1; the high voltage terminal is used to provide a high voltage VDD;

The first energy storage circuit 31 includes a second storage capacitor C2;

The first end of C2 is electrically connected to the second node P2, and the second end of C2 is electrically connected to the second clock signal output terminal K2;

The output circuit 30 includes a first output transistor T10 and a second output transistor T9;

The gate electrode of the first output transistor T10 is electrically connected to the first node P1, the source electrode of the first output transistor T10 is electrically connected to the low voltage terminal, and the drain electrode of the first output transistor T10 is electrically connected to the gate driving signal output terminal O1;

The gate electrode of the second output transistor T9 is electrically connected to the second node P2, the source electrode of the second output transistor T9 is electrically connected to the gate driving signal output terminal O1, and the drain electrode of the second output transistor T9 is electrically connected to the second clock signal terminal K2;

The third input node control sub-circuit includes a third isolation node control sub-circuit 321 and a second isolation sub-circuit 40; the third isolation node control sub-circuit 321 includes a third control transistor T3 and a fourth control transistor T2; the second isolation sub-circuit 40 includes a second isolation transistor T14, wherein, The gate electrode of T3 is electrically connected to the first clock signal terminal K1, the source electrode of T3 is electrically connected to the low voltage terminal, and the drain electrode of T3 is electrically connected to the second isolation node P32;

The gate electrode of T2 is electrically connected to the first isolation node P31, the source electrode of T2 is electrically connected to the first clock signal terminal K1, and the drain electrode of T2 is electrically connected to the second isolation node P32;

The gate electrode of T14 is electrically connected to the low voltage terminal, the source electrode of T14 is electrically connected to the second isolation node P32, and the drain electrode of T14 is electrically connected to the third input node P13; the low voltage terminal is used to provide low voltage VSS;

The second input node control sub-circuit 33 includes a fifth control transistor T6 and a first capacitor C1;

The gate electrode of T6 is electrically connected to the third input node P13, the source electrode of the eighth control transistor T6 is electrically connected to the second input node P12, and the drain electrode of the eighth control transistor T6 is connected to the input clock signal Terminal KI;

The first end of the first capacitor C1 is electrically connected to the third input node P13, and the second end of the first capacitor C1 is electrically connected to the second input node P12;

The second node control sub-circuit 34 includes a sixth control transistor T7 and a seventh control transistor T8;

The gate electrode of T7 is electrically connected to the input clock signal terminal KI, the source electrode of T7 is electrically connected to the second input node P12, and the drain electrode of T7 is electrically connected to the second node P2;

The gate electrode of T8 is electrically connected to the first isolation node P31, the source electrode of T8 is electrically connected to the high voltage terminal, and the drain electrode of T8 is electrically connected to the second node P2; the high voltage terminal is used to provide a high voltage VDD.

In at least one embodiment shown in FIG. 20, the ratio of the capacitance value of C4 to the capacitance value of C1 may be greater than or equal to 1 and less than or equal to 10, but not limited thereto.

In at least one embodiment shown in FIG. 20, all transistors are p-type thin film transistors, the first voltage signal is a negative voltage signal, the second voltage terminal is a low voltage terminal, the third voltage terminal is a high voltage terminal, and the output voltage terminal is a low voltage terminal, but not limited thereto.

The difference between at least one embodiment of the gate driving unit shown in FIG. 20 and at least one embodiment of the gate driving unit shown in FIG. 17 is that the source electrode of T8 is electrically connected to the high voltage terminal (the high voltage terminal is used to provide a high voltage VDD), which reduces the load of the second clock signal terminal, and does not need to repeatedly charge and discharge P2, which is beneficial to further reduce the load.

Figure 21:
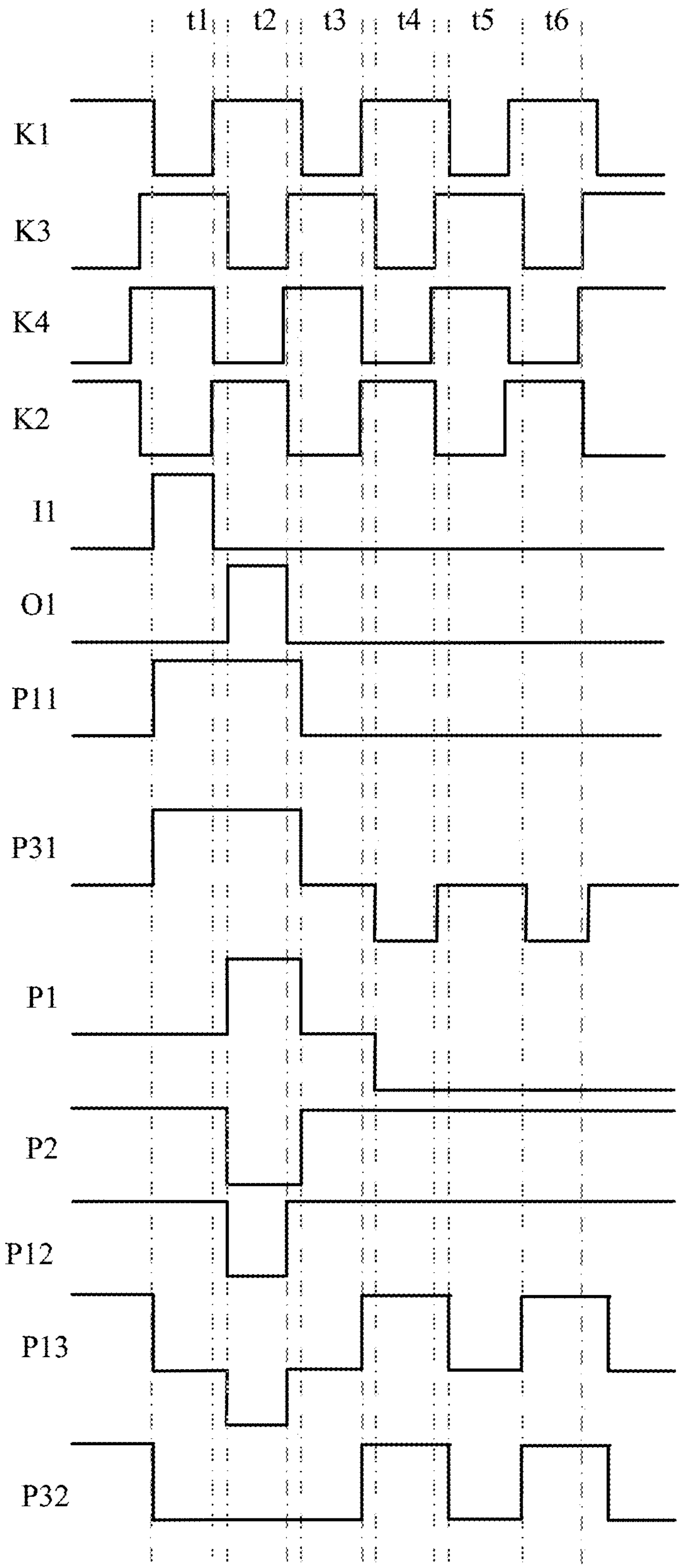
FIG. 21 is a timing diagram of the gate driving unit as shown in FIG. 20 according to at least one specific embodiment of the present disclosure.

As shown in FIG. 21, when at least one embodiment of the gate driving unit shown in FIG. 20 is in operation, In the input phase t1, K1 provides a low voltage, KI provides a high voltage, K2 provides a low voltage, I1 provides a high voltage, T12 and T1 are turned on, T13 is turned on, the potential of P11 is a high voltage, the potential of P31 is a high voltage, T5 and T4 are turned off; T2 is turned off, T3 is turned on, T14 is turned on, the potential of P32 is a low voltage, the potential of P13 is a low voltage, T6 is turned on, the potential of P12 is a high voltage, T7 is turned off, T8 is turned off, T11 is turned off, and the potential of P1 is maintained at a low voltage, the potential of P2 is maintained at a high voltage, T10 is turned on, T9 is turned off, and O1 outputs a low voltage;

In the output phase t2, K1 provides a high voltage, KI provides a low voltage, K2 provides a high voltage, I1 provides a low voltage, both T12 and T1 are turned off, the potential of P11 is maintained at high voltage, T13 is turned on, and the potential of P31 is a high voltage; T4 is turned off, T5 is turned off, the potential of P32 is maintained at a low voltage, T14 is turned on, the potential of P13 is further pulled down by C1, T6 is turned on, the potential of P12 is a low voltage, T7 is turned on, T8 is turned off, T11 is turned on, and the potential of P1 is a high voltage, the potential of P2 is a low voltage, T9 is turned on, T10 is turned off, and O1 outputs a high voltage;

In the reset phase t3, K1 provides a low voltage, KI provides a high voltage, K2 provides a low voltage, I1 provides a low voltage, both T12 and T1 are turned on, the potential of P11 is pulled down, T13 is turned on, the potential of P31 is pulled down, and T5 is turned on, the potential of P1 is pulled down; T10 is turned on; T3 is turned on, the potential of P32 is a low voltage, T14 is turned on, the potential of P13 and the potential of P12 are pulled up, and T7 is turned off; and at this time, T8 is turned on, and the potential of P2 is a high voltage, T9 is also turned on. The gate driving signal output terminal is discharged through T9 and T10 at the same time, the discharge speed of the gate driving signal output terminal can be improved, so as to realize a complete and fast reset of the gate driving signal;

In the first maintenance phase t4 included in the maintenance phase, K1 provides a high voltage, KI provides a low voltage, K2 provides a high voltage, I1 provides a low voltage, both T12 and T1 are turned off, the potential of P11 is maintained at a low voltage, T13 is turned on, and T4 is turned on, KI pulls down the potential of P31 through C4, and T5 is turned on, so that the potential of P1 is maintained less than VSS+Vth, Vth is the threshold voltage of T10, so that T10 is turned on, and the potential of the gate driving signal outputted by O1 is maintained at VSS and is not affected by noise interference; T3 is turned off, T2 is turned on, the potential of P32 is a high voltage, T14 is turned on, the potential of P13 is a high voltage, the potential of P12 is a high voltage, T7 is turned on, T8 is turned on, and the potential of P2 is a high voltage, T9 is turned off;

In the second maintenance phase t5 included in the maintenance phase, K1 provides a low voltage, KI provides a high voltage, K2 provides a low voltage, I1 provides a low voltage, both T12 and T1 are turned on, the potential of P11 is a low voltage, T13 is turned on, and T4 is turned on, the potential of the input clock signal provided by KI is increased, thereby pulling up the potential of P31, T5 is turned off, and the potential of P1 is not affected, so that the potential of P1 is maintained less VSS+Vth, Vth is the threshold voltage of T10, so that T10 is turned on, the potential of the gate driving signal outputted by O1 is maintained at VSS, which is not affected by noise interference; T3 is turned on, the potential of P32 is a low voltage, T2 is turned off, T14 is turned on, the potential of P13 is a low voltage, T6 is turned on, the potential of P12 is a high voltage, T7 is turned off, T8 is turned on, the potential of P2 is a high voltage, and T9 is turned off;

In the third maintenance phase t6 included in the maintenance phase, K1 provides a high voltage, KI provides a low voltage, K2 provides a high voltage, I1 provides a low voltage, both T12 and T1 are turned off, the potential of P11 is maintained at a low voltage, T4 is turned on, and the potential of P31 is pulled down by KI through C4, and T5 is turned on, so that the potential of P1 is maintained less than VSS+Vth, and Vth is the threshold voltage of T10, so that T10 is turned on, the potential of the gate driving signal outputted by O1 is maintained at VSS, is not affected by noise interference; T3 is turned off, T2 is turned on, the potential of P32 is a high voltage, T14 is turned on, the potential of P13 is a high voltage, T6 is turned off, the potential of P12 is a high voltage, T7 is turned on, T8 is turned on, and the potential of P2 is a high voltage, T9 is turned off;

In the maintenance phase, the potential of P1 can be maintained less than VSS+Vth, Vth is the threshold voltage of T10, so that T10 is turned on, and the potential of the gate driving signal outputted by O1 is maintained at VSS, which is not affected by noise interference.

Figure 22:
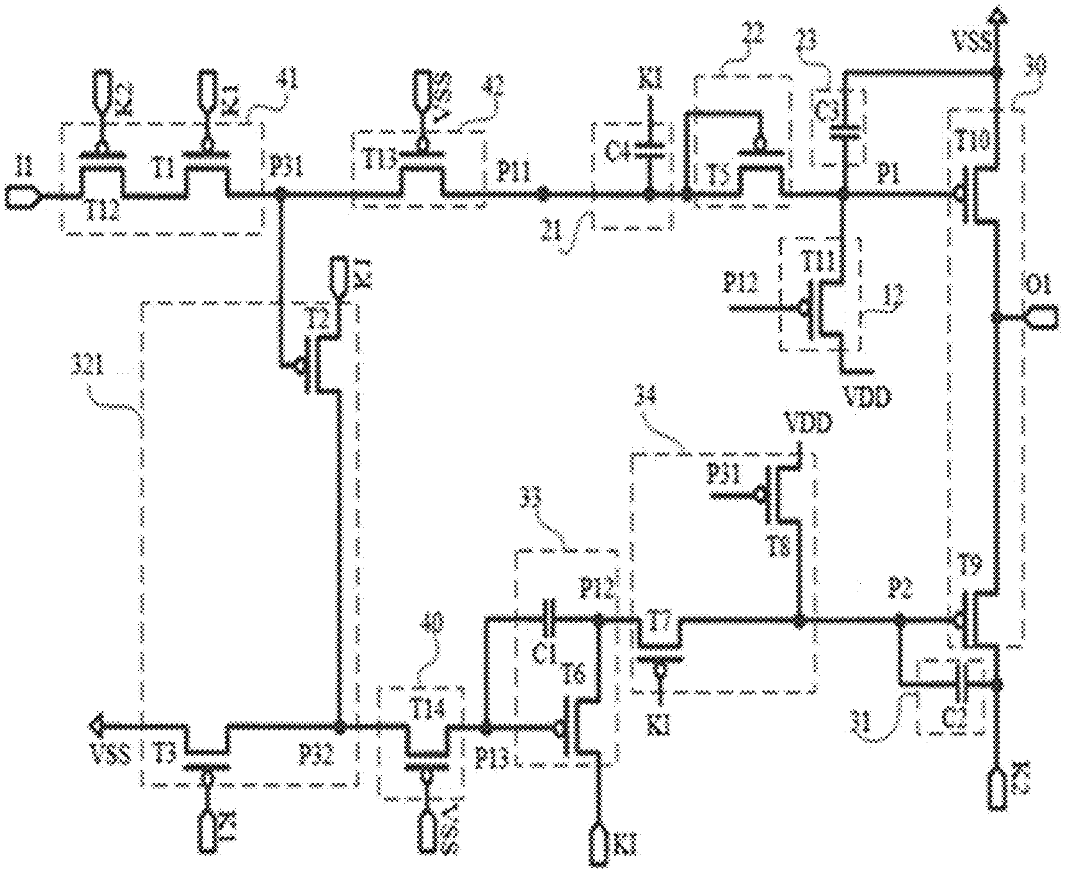
FIG. 22 is a circuit diagram of the gate driving unit according to at least one embodiment of the present disclosure.

As shown in FIG. 22, on the basis of at least one embodiment of the gate driving unit shown in FIG. 12, in at least one embodiment of the gate driving unit described in the present disclosure, The first isolation node control sub-circuit 41 includes a first control transistor T12 and a second control transistor T1, wherein, The gate electrode of the first control transistor T12 is electrically connected to the second clock signal terminal K2, and the source electrode of the first control transistor T12 is electrically connected to the input terminal;

The gate electrode of the second control transistor T1 is electrically connected to the first clock signal terminal K1, the source electrode of the second control transistor T1 is electrically connected to the drain electrode of the first control transistor T12, and the drain electrode of the second control transistor T1 is electrically connected to the first isolation node P31;

The first isolation sub-circuit 42 includes a first isolation transistor T13;

The gate electrode of the first isolation transistor T13 is electrically connected to the low voltage terminal, the source electrode of the first isolation transistor T13 is electrically connected to the first isolation node P31, and the drain electrode of the first isolation transistor T13 is electrically connected to the first input node P11; the low voltage terminal is used to provide the low voltage VSS;

The input energy storage sub-circuit 21 includes an input capacitor C4, the on-off control sub-circuit 22 includes an on-off control transistor T5, and the first energy storage sub-circuit 23 includes a first storage capacitor C3;

The first end of C4 is electrically connected to the input clock signal KI, and the second end of C4 is electrically connected to the first input node P11;

The gate electrode of T5 and the source electrode of T5 are both electrically connected to the first input node P11, and the drain electrode of T5 is electrically connected to the first node P1;

The first end of C3 is electrically connected to the first node P1, and the second end of C3 is electrically connected to the low voltage terminal; the low voltage terminal is used to provide the low voltage VSS;

The first node control circuit 12 includes a first node control transistor T11;

The gate electrode of T11 is electrically connected to the second input node P12, the source electrode of T11 is electrically connected to the high voltage terminal, and the drain electrode of T11 is electrically connected to the first node P1; the high voltage terminal is used to provide a high voltage VDD;

The first energy storage circuit 31 includes a second storage capacitor C2;

The first end of C2 is electrically connected to the second node P2, and the second end of C2 is electrically connected to the second clock signal output terminal K2;

The output circuit 30 includes a first output transistor T10 and a second output transistor T9;

The gate electrode of the first output transistor T10 is electrically connected to the first node P1, the source electrode of the first output transistor T10 is electrically connected to the low voltage terminal, and the drain electrode of the first output transistor T10 is electrically connected to the gate driving signal output terminal O1;

The gate electrode of the second output transistor T9 is electrically connected to the second node P2, the source electrode of the second output transistor T9 is electrically connected to the gate driving signal output terminal O1, and the drain electrode of the second output transistor T9 is electrically connected to the second clock signal terminal K2;

The third input node control sub-circuit includes a third isolation node control sub-circuit 321 and a second isolation sub-circuit 40; the third isolation node control sub-circuit 321 includes a third control transistor T3 and a fourth control transistor T2; the second isolation sub-circuit 40 includes a second isolation transistor T14, wherein, The gate electrode of T3 is electrically connected to the first clock signal terminal K1, the source electrode of T3 is electrically connected to the low voltage terminal, and the drain electrode of T3 is electrically connected to the second isolation node P32;

The gate electrode of T2 is electrically connected to the first isolation node P31, the source electrode of T2 is electrically connected to the first clock signal terminal K1, and the drain electrode of T2 is electrically connected to the second isolation node P32;

The gate electrode of T14 is electrically connected to the low voltage terminal, the source electrode of T14 is electrically connected to the second isolation node P32, and the drain electrode of T14 is electrically connected to the third input node P13;

The second input node control sub-circuit 33 includes a fifth control transistor T6 and a first capacitor C1;

The gate electrode of T6 is electrically connected to the third input node P13, the source electrode of the eighth control transistor T6 is electrically connected to the second input node P12, and the drain electrode of the eighth control transistor T6 is connected to the input clock signal Terminal KI;

The first end of the first capacitor C1 is electrically connected to the third input node P13, and the second end of the first capacitor C1 is electrically connected to the second input node P12;

The second node control sub-circuit 34 includes a sixth control transistor T7 and a seventh control transistor T8;

The gate electrode of T7 is electrically connected to the input clock signal terminal KI, the source electrode of T7 is electrically connected to the second input node P12, and the drain electrode of T7 is electrically connected to the second node P2;

The gate electrode of T8 is electrically connected to the first isolation node P31, the source electrode of T8 is electrically connected to the high voltage terminal, and the drain electrode of T8 is electrically connected to the second node P2; the high voltage terminal is used to provide a high voltage VDD.

In at least one embodiment shown in FIG. 22, the ratio of the capacitance value of C4 to the capacitance value of C1 may be greater than or equal to 1 and less than or equal to 10, but not limited thereto.

In at least one embodiment shown in FIG. 22, all transistors are p-type thin film transistors, the first voltage signal is a negative voltage signal, the second voltage terminal is a low voltage terminal, the third voltage terminal is a high voltage terminal, and the output voltage terminal is a low voltage terminal, but not limited thereto.

The difference between at least one embodiment of the gate driving unit shown in FIG. 22 of the present disclosure and at least one embodiment of the gate driving unit shown in FIG. 20 of the present disclosure is as follows: the charge pump circuit does not include a switch control sub-circuit.

Figure 23:
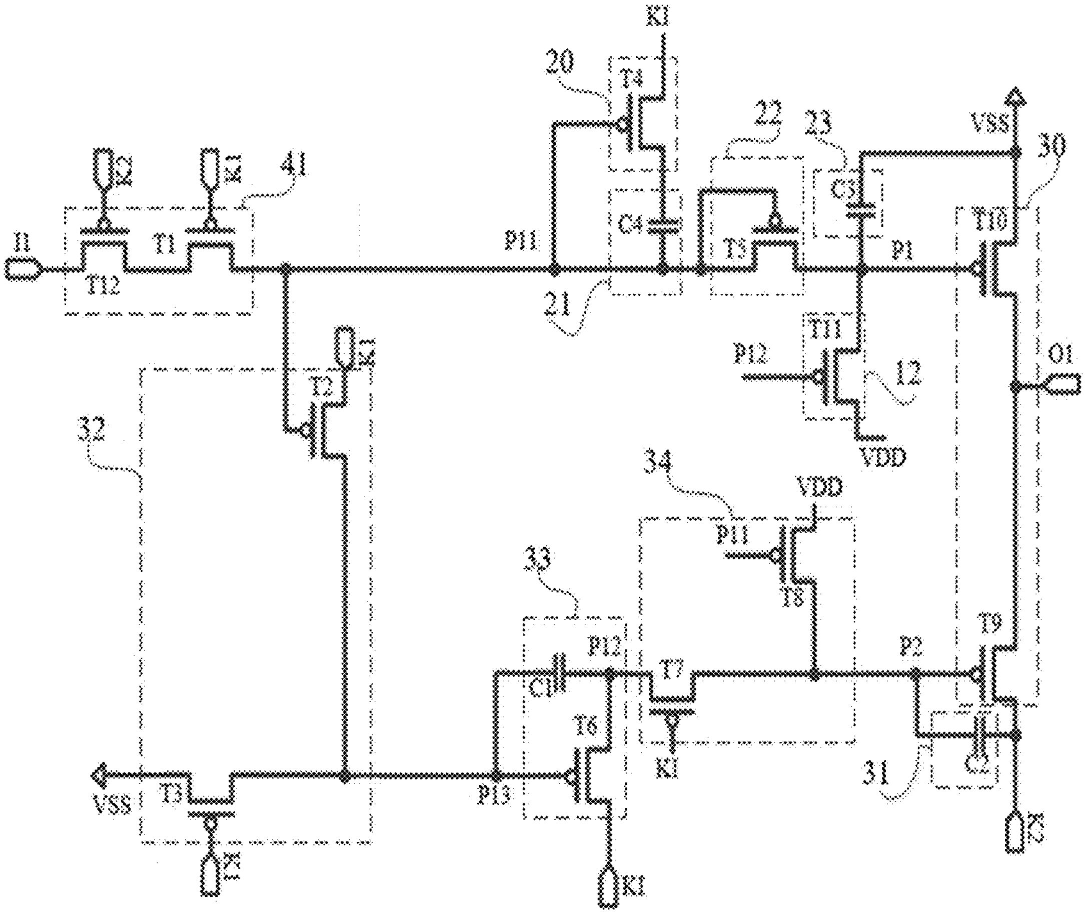
FIG. 23 is a circuit diagram of the gate driving unit according to at least one embodiment of the present disclosure.

As shown in FIG. 23, on the basis of at least one embodiment of the gate driving unit shown in FIG. 8, in at least one embodiment of the gate driving unit described in the present disclosure, the charge pump circuit further includes a switch control sub-circuit 20; the switch control sub-circuit 20 includes a switch control transistor T4; the first input node control circuit 10 includes a first control transistor T12 and a second control transistor T1, wherein, The gate electrode of the first control transistor T12 is electrically connected to the second clock signal terminal K2, and the source electrode of the first control transistor T12 is electrically connected to the input terminal;

The gate electrode of the second control transistor T1 is electrically connected to the first clock signal terminal K1, the source electrode of the second control transistor T1 is electrically connected to the drain electrode of the first control transistor T12, and the drain electrode of the second control transistor T1 is electrically connected to the first input node P11; the input energy storage sub-circuit 21 includes an input capacitor C4, the on-off control sub-circuit 22 includes an on-off control transistor T5, and the first energy storage sub-circuit 23 includes a first storage capacitor C3;

The gate electrode of T4 is electrically connected to the first input node P11, the source electrode of T4 is electrically connected to the input clock signal terminal KI, the drain electrode of T4 is electrically connected to the first end of C4; the second end of C4 is electrically connected to the first input node P11; the first end of C4 is electrically connected to the first control node P21;

The gate electrode of T5 and the source electrode of T5 are both electrically connected to the first input node P11, and the drain electrode of T5 is electrically connected to the first node P1;

The first end of C3 is electrically connected to the first node P1, and the second end of C3 is electrically connected to the low voltage terminal; the low voltage terminal is used to provide the low voltage VSS;

The first node control circuit 12 includes a first node control transistor T11;

The gate electrode of T11 is electrically connected to the second input node P12, the source electrode of T11 is electrically connected to the high voltage terminal, and the drain electrode of T11 is electrically connected to the first node P1; the high voltage terminal is used to provide a high voltage VDD;

The first energy storage circuit 31 includes a second storage capacitor C2;

The first end of C2 is electrically connected to the second node P2, and the second end of C2 is electrically connected to the second clock signal output terminal K2;

The output circuit 30 includes a first output transistor T10 and a second output transistor T9;

The gate electrode of the first output transistor T10 is electrically connected to the first node P1, the source electrode of the first output transistor T10 is electrically connected to the low voltage terminal, and the drain electrode of the first output transistor T10 is electrically connected to the gate driving signal output terminal O1;

The gate electrode of the second output transistor T9 is electrically connected to the second node P2, the source electrode of the second output transistor T9 is electrically connected to the gate driving signal output terminal O1, and the drain electrode of the second output transistor T9 is electrically connected to the second clock signal terminal K2;

The third input node control sub-circuit 32 includes a third control transistor T3 and a fourth control transistor T2, wherein, The gate electrode of T3 is electrically connected to the first clock signal terminal K1, the source electrode of T3 is electrically connected to the low voltage terminal, and the drain electrode of T3 is electrically connected to the third input node P13;

The gate electrode of T2 is electrically connected to the first input node P11, the source electrode of T2 is electrically connected to the first clock signal terminal K1, the drain electrode of T2 is electrically connected to the third input node P13; the second input node control sub-circuit 33 includes a fifth control transistor T6 and a first capacitor C1;

The gate electrode of T6 is electrically connected to the third input node P13, the source electrode of the eighth control transistor T6 is electrically connected to the second input node P12, and the drain electrode of the eighth control transistor T6 is connected to the input clock signal terminal KI;

The first end of the first capacitor C1 is electrically connected to the third input node P13, and the second end of the first capacitor C1 is electrically connected to the second input node P12;

The second node control sub-circuit 34 includes a sixth control transistor T7 and a seventh control transistor T8;

The gate electrode of T7 is electrically connected to the input clock signal terminal KI, the source electrode of T7 is electrically connected to the second input node P12, and the drain electrode of T7 is electrically connected to the second node P2;

The gate electrode of T8 is electrically connected to the first isolation node P31, the source electrode of T8 is electrically connected to the high voltage terminal, and the drain electrode of T8 is electrically connected to the second node P2; the high voltage terminal is used to provide a high voltage VDD.

In the at least first embodiment shown in FIG. 23, the ratio of the capacitance value of C4 to the capacitance value of C1 may be greater than or equal to 1 and less than or equal to 10, but not limited thereto.

In at least one embodiment shown in FIG. 23, all transistors are p-type thin film transistors, the first voltage signal is a negative voltage signal, the second voltage terminal is a low voltage terminal, the third voltage terminal is a high voltage terminal, and the output voltage terminal is a low voltage terminal, but not limited thereto.

The difference between at least one embodiment of the gate driving unit shown in FIG. 23 of the present disclosure and at least one embodiment of the gate driving unit shown in FIG. 20 of the present disclosure is as follows: the gate driving unit does not include the first isolation transistor and a second isolation transistor.

Figure 24:
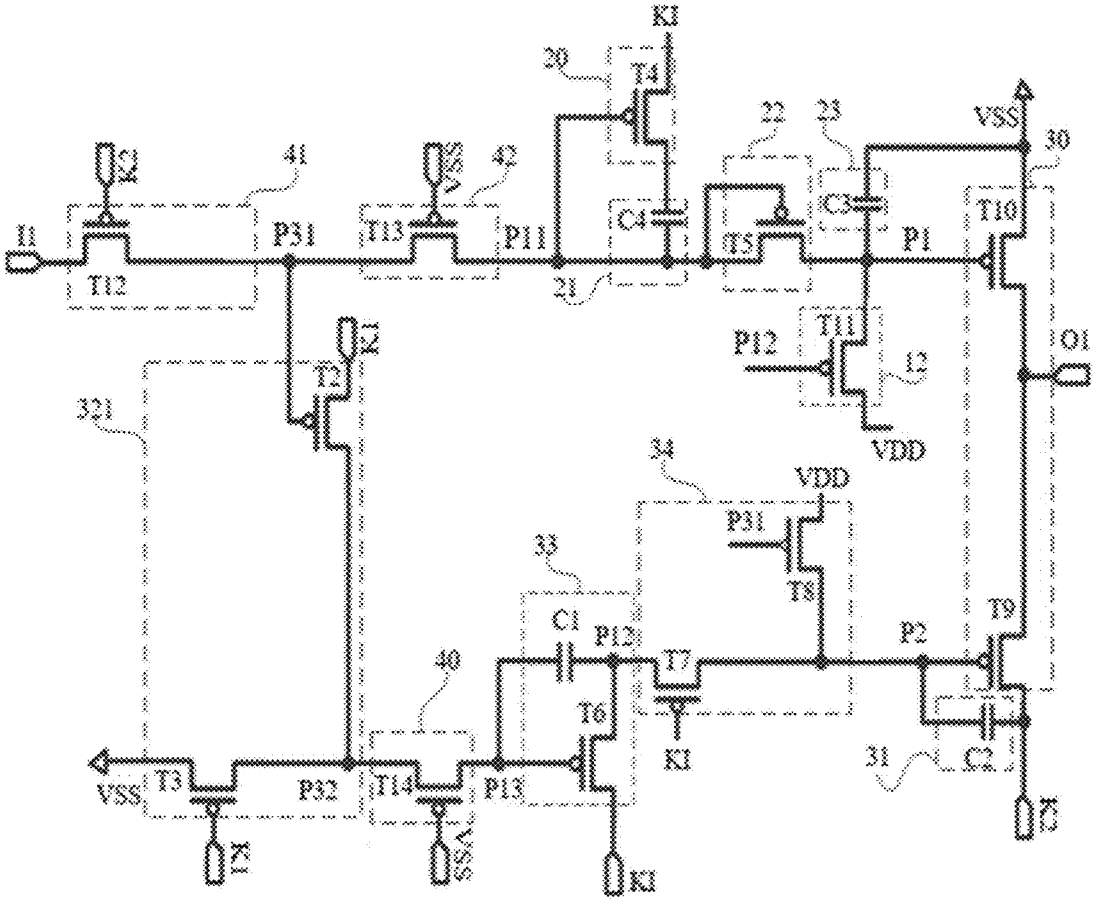
FIG. 24 is a circuit diagram of the gate driving unit according to at least one embodiment of the present disclosure.

As shown in FIG. 24, on the basis of at least one embodiment of the gate driving unit shown in FIG. 12, in at least one embodiment of the gate driving unit described in the present disclosure, the charge pump circuit further includes a switch control sub-circuit 20; the switch control sub-circuit 20 includes a switch control transistor T4;

The first isolation node control sub-circuit 41 includes a first control transistor T12, wherein, The gate electrode of the first control transistor T12 is electrically connected to the second clock signal terminal K2, and the source electrode of the first control transistor T12 is electrically connected to the input terminal;

The first isolation sub-circuit 42 includes a first isolation transistor T13;

The gate electrode of the first isolation transistor T13 is electrically connected to the low voltage terminal, the source electrode of the first isolation transistor T13 is electrically connected to the first isolation node P31, and the drain electrode of the first isolation transistor T13 is electrically connected to the first input node P11; the low voltage terminal is used to provide the low voltage VSS;

The input energy storage sub-circuit 21 includes an input capacitor C4, the on-off control sub-circuit 22 includes an on-off control transistor T5, and the first energy storage sub-circuit 23 includes a first storage capacitor C3;

The gate electrode of T4 is electrically connected to the first input node P11, the source electrode of T4 is electrically connected to the input clock signal terminal KI, the drain electrode of T4 is electrically connected to the first end of C4; the second end of C4 is electrically connected to the first input node P11; the first end of C4 is electrically connected to the first control node P21;

The gate electrode of T5 and the source electrode of T5 are both electrically connected to the first input node P11, and the drain electrode of T5 is electrically connected to the first node P1;

The first end of C3 is electrically connected to the first node P1, and the second end of C3 is electrically connected to the low voltage terminal; the low voltage terminal is used to provide the low voltage VSS;

The first node control circuit 12 includes a first node control transistor T11;

The gate electrode of T11 is electrically connected to the second input node P12, the source electrode of T11 is electrically connected to the high voltage terminal, and the drain electrode of T11 is electrically connected to the first node P1; the high voltage terminal is used to provide a high voltage VDD;

The first energy storage circuit 31 includes a second storage capacitor C2;

The first end of C2 is electrically connected to the second node P2, and the second end of C2 is electrically connected to the second clock signal output terminal K2;

The output circuit 30 includes a first output transistor T10 and a second output transistor T9;

The gate electrode of the first output transistor T10 is electrically connected to the first node P1, the source electrode of the first output transistor T10 is electrically connected to the low voltage terminal, and the drain electrode of the first output transistor T10 is electrically connected to the gate driving signal output terminal O1;

The gate electrode of the second output transistor T9 is electrically connected to the second node P2, the source electrode of the second output transistor T9 is electrically connected to the gate driving signal output terminal O1, and the drain electrode of the second output transistor T9 is electrically connected to the second clock signal terminal K2;

The third input node control sub-circuit includes a third isolation node control sub-circuit 321 and a second isolation sub-circuit 40; the third isolation node control sub-circuit 321 includes a third control transistor T3 and a fourth control transistor T2; the second isolation sub-circuit 40 includes a second isolation transistor T14, wherein, The gate electrode of T3 is electrically connected to the first clock signal terminal K1, the source electrode of T3 is electrically connected to the low voltage terminal, and the drain electrode of T3 is electrically connected to the second isolation node P32;

The gate electrode of T2 is electrically connected to the first isolation node P31, the source electrode of T2 is electrically connected to the first clock signal terminal K1, and the drain electrode of T2 is electrically connected to the second isolation node P32;

The gate electrode of T14 is electrically connected to the low voltage terminal, the source electrode of T14 is electrically connected to the second isolation node P32, and the drain electrode of T14 is electrically connected to the third input node P13; the low voltage terminal is used to provide low voltage VSS;

The second input node control sub-circuit 33 includes a fifth control transistor T6 and a first capacitor C1;

The gate electrode of T6 is electrically connected to the third input node P13, the source electrode of the eighth control transistor T6 is electrically connected to the second input node P12, and the drain electrode of the eighth control transistor T6 is connected to the input clock signal Terminal KI;

The first end of the first capacitor C1 is electrically connected to the third input node P13, and the second end of the first capacitor C1 is electrically connected to the second input node P12;

The second node control sub-circuit 34 includes a sixth control transistor T7 and a seventh control transistor T8;

The gate electrode of T7 is electrically connected to the input clock signal terminal KI, the source electrode of T7 is electrically connected to the second input node P12, and the drain electrode of T7 is electrically connected to the second node P2;

The gate electrode of T8 is electrically connected to the first isolation node P31, the source electrode of T8 is electrically connected to the high voltage terminal, and the drain electrode of T8 is electrically connected to the second node P2; the high voltage terminal is used to provide a high voltage VDD.

In at least one embodiment shown in FIG. 24, the ratio of the capacitance value of C4 to the capacitance value of C1 may be greater than or equal to 1 and less than or equal to 10, but not limited thereto.

In at least one embodiment shown in FIG. 24, all transistors are p-type thin film transistors, the first voltage signal is a negative voltage signal, the second voltage terminal is a low voltage terminal, the third voltage terminal is a high voltage terminal, and the output voltage terminal is a low voltage terminal, but not limited thereto.

The difference between at least one embodiment of the gate driving unit shown in FIG. 24 of the present disclosure and at least one embodiment of the gate driving unit shown in FIG. 20 of the present disclosure is as follows: the first isolation node control sub-circuit 41 only includes the first control transistor T12, the first isolation node control sub-circuit 41 does not include the second control transistor T1, as long as that the rising edge of the second clock signal is not earlier than the falling edge of the input signal provided by I1.

Figure 25:
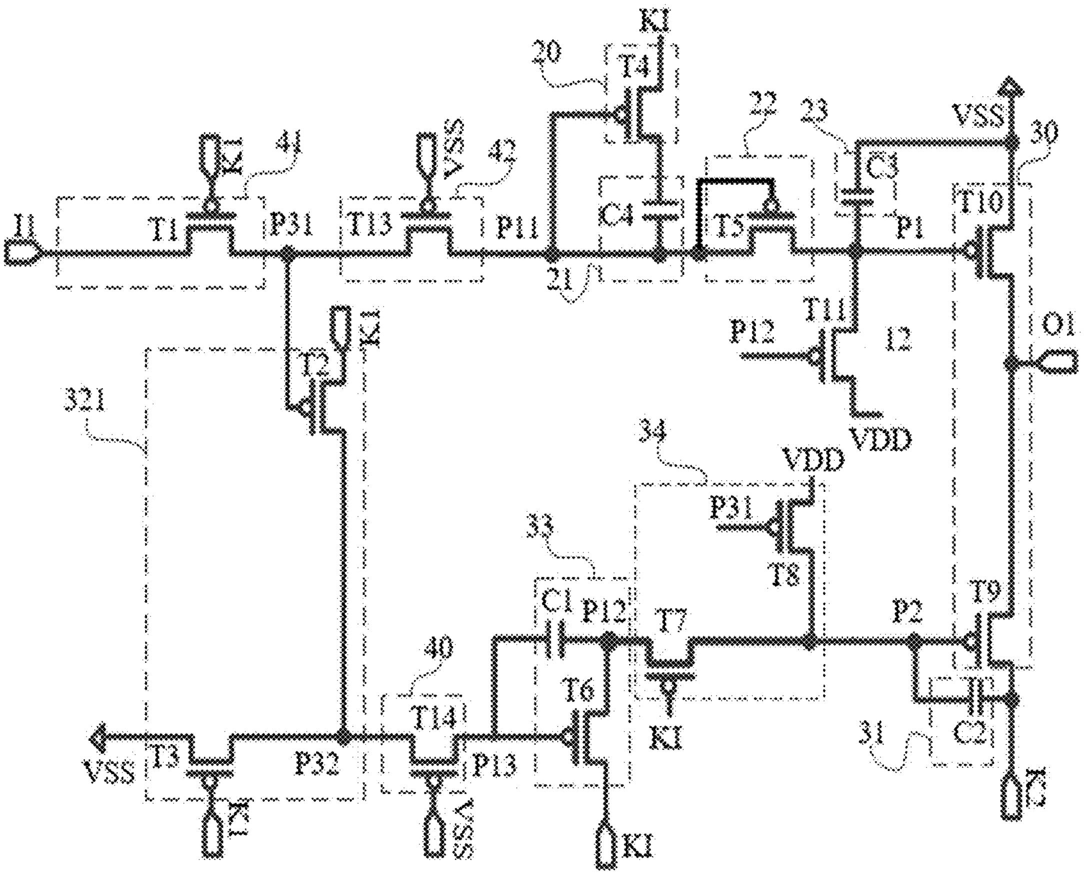
FIG. 25 is a circuit diagram of the gate driving unit according to at least one embodiment of the present disclosure.

As shown in FIG. 25, on the basis of at least one embodiment of the gate driving unit shown in FIG. 12, in at least one embodiment of the gate driving unit described in the present disclosure, the charge pump circuit further includes a switch control sub-circuit 20; the switch control sub-circuit 20 includes a switch control transistor T4;

The first isolation node control sub-circuit 41 includes a second control transistor T1, wherein, The gate electrode of the second control transistor T1 is electrically connected to the first clock signal terminal K1, the source electrode of the second control transistor T1 is electrically connected to the drain electrode of the first control transistor T12, and the drain electrode of the second control transistor T1 is electrically connected to the first input node P11;

The first isolation sub-circuit 42 includes a first isolation transistor T13;

The gate electrode of the first isolation transistor T13 is electrically connected to the low voltage terminal, the source electrode of the first isolation transistor T13 is electrically connected to the first isolation node P31, and the drain electrode of the first isolation transistor T13 is electrically connected to the first input node P11; the low voltage terminal is used to provide the low voltage VSS;

The input energy storage sub-circuit 21 includes an input capacitor C4, the on-off control sub-circuit 22 includes an on-off control transistor T5, and the first energy storage sub-circuit 23 includes a first storage capacitor C3;

The gate electrode of T4 is electrically connected to the first input node P11, the source electrode of T4 is electrically connected to the input clock signal terminal KI, the drain electrode of T4 is electrically connected to the first end of C4; the second end of C4 is electrically connected to the first input node P11; the first end of C4 is electrically connected to the first control node P21;

The gate electrode of T5 and the source electrode of T5 are both electrically connected to the first input node P11, and the drain electrode of T5 is electrically connected to the first node P1;

The first end of C3 is electrically connected to the first node P1, and the second end of C3 is electrically connected to the low voltage terminal; the low voltage terminal is used to provide the low voltage VSS;

The first node control circuit 12 includes a first node control transistor T11;

The gate electrode of T11 is electrically connected to the second input node P12, the source electrode of T11 is electrically connected to the high voltage terminal, and the drain electrode of T11 is electrically connected to the first node P1; the high voltage terminal is used to provide a high voltage VDD;

The first energy storage circuit 31 includes a second storage capacitor C2;

The first end of C2 is electrically connected to the second node P2, and the second end of C2 is electrically connected to the second clock signal output terminal K2;

The output circuit 30 includes a first output transistor T10 and a second output transistor T9;

The gate electrode of the first output transistor T10 is electrically connected to the first node P1, the source electrode of the first output transistor T10 is electrically connected to the low voltage terminal, and the drain electrode of the first output transistor T10 is electrically connected to the gate driving signal output terminal O1;

The gate electrode of the second output transistor T9 is electrically connected to the second node P2, the source electrode of the second output transistor T9 is electrically connected to the gate driving signal output terminal O1, and the drain electrode of the second output transistor T9 is electrically connected to the second clock signal terminal K2;

The third input node control sub-circuit includes a third isolation node control sub-circuit 321 and a second isolation sub-circuit 40; the third isolation node control sub-circuit 321 includes a third control transistor T3 and a fourth control transistor T2; the second isolation sub-circuit 40 includes a second isolation transistor T14, wherein, The gate electrode of T3 is electrically connected to the first clock signal terminal K1, the source electrode of T3 is electrically connected to the low voltage terminal, and the drain electrode of T3 is electrically connected to the second isolation node P32;

The gate electrode of T2 is electrically connected to the first isolation node P31, the source electrode of T2 is electrically connected to the first clock signal terminal K1, and the drain electrode of T2 is electrically connected to the second isolation node P32;

The gate electrode of T14 is electrically connected to the low voltage terminal, the source electrode of T14 is electrically connected to the second isolation node P32, and the drain electrode of T14 is electrically connected to the third input node P13; the low voltage terminal is used to provide low voltage VSS;

The second input node control sub-circuit 33 includes a fifth control transistor T6 and a first capacitor C1;

The gate electrode of T6 is electrically connected to the third input node P13, the source electrode of the eighth control transistor T6 is electrically connected to the second input node P12, and the drain electrode of the eighth control transistor T6 is connected to the input clock signal Terminal KI;

The first end of the first capacitor C1 is electrically connected to the third input node P13, and the second end of the first capacitor C1 is electrically connected to the second input node P12;

The second node control sub-circuit 34 includes a sixth control transistor T7 and a seventh control transistor T8;

The gate electrode of T7 is electrically connected to the input clock signal terminal KI, the source electrode of T7 is electrically connected to the second input node P12, and the drain electrode of T7 is electrically connected to the second node P2;

The gate electrode of T8 is electrically connected to the first isolation node P31, the source electrode of T8 is electrically connected to the high voltage terminal, and the drain electrode of T8 is electrically connected to the second node P2; the high voltage terminal is used to provide a high voltage VDD.

In at least one embodiment shown in FIG. 25, the ratio of the capacitance value of C4 to the capacitance value of C1 may be greater than or equal to 1 and less than or equal to 10, but not limited thereto.

In at least one embodiment shown in FIG. 25, all transistors are p-type thin film transistors, the first voltage signal is a negative voltage signal, the second voltage terminal is a low voltage terminal, the third voltage terminal is a high voltage terminal, and the output voltage terminal is a low voltage terminal, but not limited thereto.

The difference between at least one embodiment of the gate driving unit shown in FIG. 25 of the present disclosure and at least one embodiment of the gate driving unit shown in FIG. 20 of the present disclosure is as follows: the first isolation node control sub-circuit 41 only includes the second control transistor T1, the first isolation node control sub-circuit 41 does not include the first control transistor T12, as long as that the rising edge of the first clock signal is not earlier than the falling edge of the input signal provided by I1.

Figure 26:
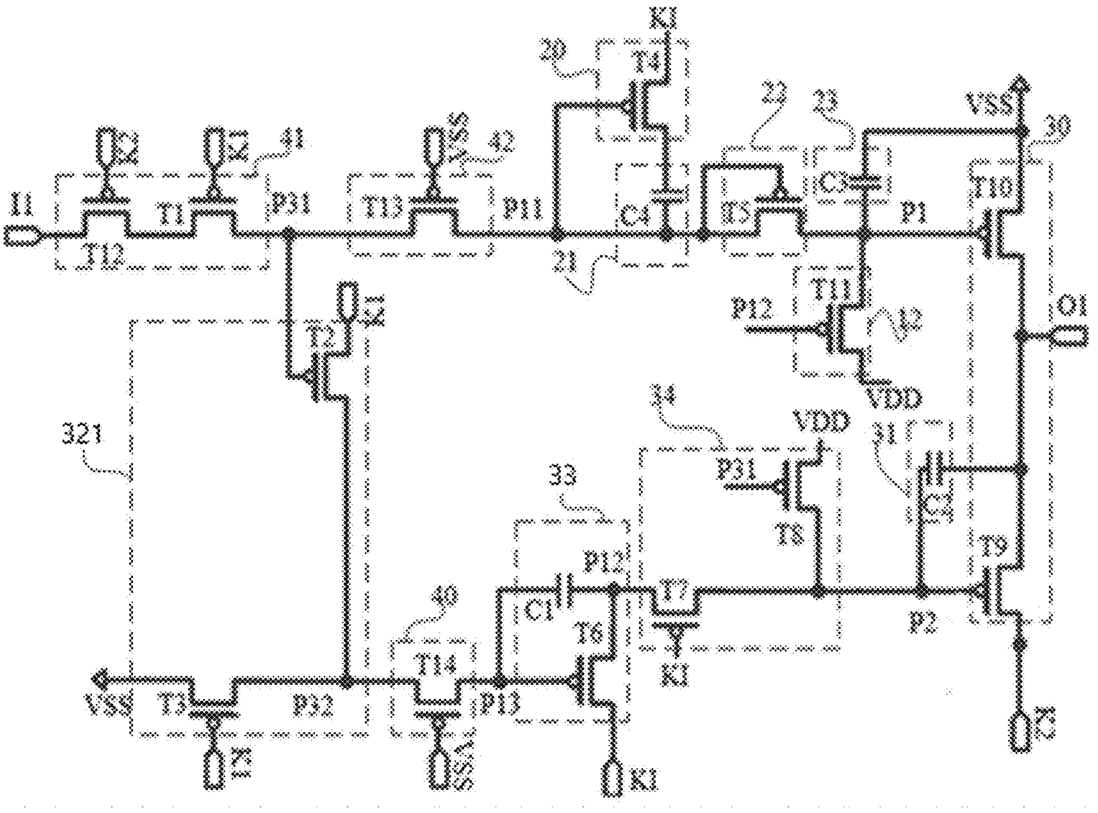
FIG. 26 is a circuit diagram of the gate driving unit according to at least one embodiment of the present disclosure.

As shown in FIG. 26, on the basis of at least one embodiment of the gate driving unit shown in FIG. 13, in at least one embodiment of the gate driving unit described in the present disclosure, The charge pump circuit further includes a switch control sub-circuit 20; the switch control sub-circuit 20 includes a switch control transistor T4;

The first isolation node control sub-circuit 41 includes a first control transistor T12 and a second control transistor T1, wherein, The gate electrode of the first control transistor T12 is electrically connected to the second clock signal terminal K2, and the source electrode of the first control transistor T12 is electrically connected to the input terminal;

The gate electrode of the second control transistor T1 is electrically connected to the first clock signal terminal K1, the source electrode of the second control transistor T1 is electrically connected to the drain electrode of the first control transistor T12, and the drain electrode of the second control transistor T1 is electrically connected to the first isolation node P31;

The first isolation sub-circuit 42 includes a first isolation transistor T13;

The gate electrode of the first isolation transistor T13 is electrically connected to the low voltage terminal, the source electrode of the first isolation transistor T13 is electrically connected to the first isolation node P31, and the drain electrode of the first isolation transistor T13 is electrically connected to the first input node P11; the low voltage terminal is used to provide the low voltage VSS;

The input energy storage sub-circuit 21 includes an input capacitor C4, the on-off control sub-circuit 22 includes an on-off control transistor T5, and the first energy storage sub-circuit 23 includes a first storage capacitor C3;

The gate electrode of T4 is electrically connected to the first input node P11, the source electrode of T4 is electrically connected to the input clock signal terminal KI, the drain electrode of T4 is electrically connected to the first end of C4; the second end of C4 is electrically connected to the first input node P11; the first end of C4 is electrically connected to the first control node P21;

The gate electrode of T5 and the source electrode of T5 are both electrically connected to the first input node P11, and the drain electrode of T5 is electrically connected to the first node P1;

The first end of C3 is electrically connected to the first node P1, and the second end of C3 is electrically connected to the low voltage terminal; the low voltage terminal is used to provide the low voltage VSS;

The first node control circuit 12 includes a first node control transistor T11;

The gate electrode of T11 is electrically connected to the second input node P12, the source electrode of T11 is electrically connected to the high voltage terminal, and the drain electrode of T11 is electrically connected to the first node P1; the high voltage terminal is used to provide a high voltage VDD;

The first energy storage circuit 31 includes a second storage capacitor C2;

The first end of C2 is electrically connected to the second node P2, and the second end of C2 is electrically connected to the gate driving signal output terminal O1;

The output circuit 30 includes a first output transistor T10 and a second output transistor T9;

The gate electrode of the first output transistor T10 is electrically connected to the first node P1, the source electrode of the first output transistor T10 is electrically connected to the low voltage terminal, and the drain electrode of the first output transistor T10 is electrically connected to the gate driving signal output terminal O1;

The gate electrode of the second output transistor T9 is electrically connected to the second node P2, the source electrode of the second output transistor T9 is electrically connected to the gate driving signal output terminal O1, and the drain electrode of the second output transistor T9 is electrically connected to the second clock signal terminal K2;

The third input node control sub-circuit includes a third isolation node control sub-circuit 321 and a second isolation sub-circuit 40; the third isolation node control sub-circuit 321 includes a third control transistor T3 and a fourth control transistor T2; the second isolation sub-circuit 40 includes a second isolation transistor T14, wherein, The gate electrode of T3 is electrically connected to the first clock signal terminal K1, the source electrode of T3 is electrically connected to the low voltage terminal, and the drain electrode of T3 is electrically connected to the second isolation node P32;

The gate electrode of T2 is electrically connected to the first isolation node P31, the source electrode of T2 is electrically connected to the first clock signal terminal K1, and the drain electrode of T2 is electrically connected to the second isolation node P32;

The gate electrode of T14 is electrically connected to the low voltage terminal, the source electrode of T14 is electrically connected to the second isolation node P32, and the drain electrode of T14 is electrically connected to the third input node P13; the low voltage terminal is used to provide low voltage VSS;

The second input node control sub-circuit 33 includes a fifth control transistor T6 and a first capacitor C1;

The gate electrode of T6 is electrically connected to the third input node P13, the source electrode of the eighth control transistor T6 is electrically connected to the second input node P12, and the drain electrode of the eighth control transistor T6 is connected to the input clock signal Terminal KI;

The first end of the first capacitor C1 is electrically connected to the third input node P13, and the second end of the first capacitor C1 is electrically connected to the second input node P12;

The second node control sub-circuit 34 includes a sixth control transistor T7 and a seventh control transistor T8;

The gate electrode of T7 is electrically connected to the input clock signal terminal KI, the source electrode of T7 is electrically connected to the second input node P12, and the drain electrode of T7 is electrically connected to the second node P2;

The gate electrode of T8 is electrically connected to the first isolation node P31, the source electrode of T8 is electrically connected to the high voltage terminal, and the drain electrode of T8 is electrically connected to the second node P2; the high voltage terminal is used to provide a high voltage VDD.

In at least one embodiment shown in FIG. 26, the ratio of the capacitance value of C4 to the capacitance value of C1 may be greater than or equal to 1 and less than or equal to 10, but not limited thereto.

In at least one embodiment shown in FIG. 26, all transistors are p-type thin film transistors, the first voltage signal is a negative voltage signal, the second voltage terminal is a low voltage terminal, the third voltage terminal is a high voltage terminal, and the output voltage terminal is a low voltage terminal, but not limited thereto.

The difference between at least one embodiment of the gate driving unit shown in FIG. 26 and at least one embodiment of the gate driving unit shown in FIG. 20 is that the second end of C2 is electrically connected to the gate driving signal output terminal, which reduces the capacitive load of the second clock signal terminal and is beneficial to reduce power consumption.

The timing diagram of the gate driving unit shown in FIG. 26 may be as shown in FIG. 21.

The driving method described in the embodiment of the present disclosure is applied to the above-mentioned gate driving unit, and the driving method includes:

Connecting or disconnect, by a first input node control circuit, an input terminal and a first input node under the control of a clock signal provided by a clock signal terminal;

When a voltage signal of the first input node is a first voltage signal, controlling, by a charge pump circuit, to convert the voltage signal of the first input node into a voltage signal of a first node under the control of an input clock signal provided by the input clock signal terminal, so that a polarity of the voltage signal of the first node is the same as a polarity of the voltage signal of the first input node, and an absolute value of a voltage value of the voltage signal of the first node is greater than an absolute value of a voltage value of the voltage signal of the first input node.

In the driving method described in the embodiment of the present disclosure, the gate driving unit can sufficiently pull down or up the potential of the first node in the maintenance phase, so that in the maintenance phase, the first output transistor controlled by the first node is turned on, the potential of the gate driving signal is not affected by noise interference.

The gate driving circuit according to the embodiment of the present disclosure includes the above-mentioned gate driving unit.

The display device according to the embodiment of the present disclosure includes the above-mentioned gate driving circuit.

The display device provided by the embodiment of the present disclosure may be any product or component with a display function, such as a mobile phone, a tablet computer, a television, a monitor, a notebook computer, a digital photo frame, and a navigator.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

The invention claimed is:

1. A gate driving unit, comprising a charge pump circuit and an output circuit; wherein the charge pump circuit is electrically connected to a first input node, an input clock signal terminal and a first node respectively, and the charge pump circuit is configured to control a voltage signal of the first input node under the control of an input clock signal provided by the input clock signal terminal, the voltage signal of the first input node is written into the first node when the voltage signal of the first input node is a first voltage signal; and the output circuit comprises a first output transistor, a control electrode of the first output transistor is electrically connected to the first node, a first electrode of the first output transistor is electrically connected to an output voltage terminal, and a second electrode of the first output transistor is electrically connected to a gate driving signal output terminal.

2. The gate driving unit according to claim 1, further comprising a first input node control circuit; wherein the first input node control circuit is electrically connected to a clock signal terminal, an input terminal and the first input node respectively, and is configured to connect or disconnect the input terminal and the first input node under the control of a clock signal provided by the clock signal terminal.

3. The gate driving unit according to claim 2, wherein the first input node control circuit comprises a first isolation node control sub-circuit and a first isolation sub-circuit;

the first isolation node control sub-circuit is electrically connected to the clock signal terminal, the input terminal and a first isolation node respectively, and is configured to connect or disconnect the input terminal and the first isolation node under the control of the clock signal provided by the clock signal terminal;

the first isolation sub-circuit is electrically connected to a second voltage terminal, the first isolation node and the first input node respectively, and is configured to connect the first isolation node and the first input node under the control of a second voltage signal provided by the second voltage terminal.

4. The gate driving unit according to claim 3, wherein the clock signal terminal includes a first clock signal terminal and a second clock signal terminal; the first isolation node control sub-circuit includes a first control transistor and a second control transistor; a control electrode of the first control transistor is electrically connected to the second clock signal terminal, a first electrode of the first control transistor is electrically connected to the input terminal, and a control electrode of the second control transistor is electrically connected to the first clock signal terminal, a first electrode of the second control transistor is electrically connected to a second electrode of the first control transistor, and a second electrode of the second control transistor is electrically connected to the first isolation node; or the clock signal terminal includes the second clock signal terminal, and the first isolation node control sub-circuit includes the first control transistor; the control electrode of the first control transistor is electrically connected to the second clock signal terminal, the first electrode of the first control transistor is electrically connected to the input terminal, and the second electrode of the first control transistor is electrically connected to the first isolation node; or the clock signal terminal includes the first clock signal terminal, and the first isolation node control sub-circuit includes the second control transistor; the control electrode of the second control transistor is connected to the first clock signal terminal, the first electrode of the second control transistor is electrically connected to the input terminal, and the second electrode of the second control transistor is electrically connected to the first isolation node.

5. The gate driving unit according to claim 3, wherein the first isolation sub-circuit comprises a first isolation transistor;

a control electrode of the first isolation transistor is electrically connected to the second voltage terminal, a first electrode of the first isolation transistor is electrically connected to the first isolation node, and a second electrode of the first isolation transistor is electrically connected to the first input node.

6. The gate driving unit according to claim 1, wherein the charge pump circuit includes an input energy storage sub-circuit, an on-off control sub-circuit and a first energy storage sub-circuit;

a first end of the input energy storage sub-circuit is electrically connected to the input clock signal terminal, and a second end of the input energy storage sub-circuit is electrically connected to the first input node, the input energy storage sub-circuit is configured to store electrical energy and control a potential of the first input node according to a potential of the input clock signal;

the on-off control sub-circuit is electrically connected to the first input node and the first node respectively, and is configured to connect to disconnect the first input node and the first node under the control of the potential of the first input node;

the first energy storage sub-circuit is electrically connected to the first node and configured to store electrical energy and maintain the potential of the first node.

7. The gate driving unit according to claim 6, wherein the input energy storage sub-circuit includes an input capacitor, the first energy storage sub-circuit includes a first storage capacitor, and the on-off control sub-circuit includes an on-off control transistor;

a first end of the input capacitor is electrically connected to the input clock signal terminal, and a second end of the input capacitor is electrically connected to the first input node;

a first end of the first storage capacitor is electrically connected to the first node, and a second end of the first storage capacitor is electrically connected to a second voltage terminal;

a control electrode of the on-off control transistor and a first electrode of the on-off control transistor are electrically connected to the first input node, and a second electrode of the on-off control transistor is electrically connected to the first node.

8. The gate driving unit according to claim 7, wherein a ratio between a capacitance value of the input capacitor and a capacitance value of the first storage capacitor is greater than or equal to 1 and less than or equal to 10.

9. The gate driving unit according to claim 1, wherein the charge pump circuit includes an input energy storage sub-circuit, an on-off control sub-circuit, a switch control sub-circuit and a first energy storage sub-circuit;

a first end of the input energy storage sub-circuit is electrically connected to the first control node, and a second end of the input energy storage sub-circuit is electrically connected to the first input node, the input energy storage sub-circuit is configured to store electrical energy and control a potential of the first input node according to a potential of the first control node;

the on-off control sub-circuit is electrically connected to the first input node and the first node respectively, and is configured to connect or disconnect the first input node and the first node under the control of the potential of the first input node;

the first energy storage sub-circuit is electrically connected to the first node and is configured to store electrical energy and maintain the potential of the first node;

the switch control sub-circuit is electrically connected to the first input node, the input clock signal terminal and the first control node, respectively, and is configured to connect to disconnect the input clock signal terminal and the first control node under the control of the potential of the first input node.

10. The gate driving unit according to claim 9, wherein the input energy storage sub-circuit includes an input capacitor, the first energy storage sub-circuit includes a first storage capacitor, and the on-off control sub-circuit includes an on-off control transistor;

a first end of the input capacitor is electrically connected to the first control node, and a second end of the input capacitor is electrically connected to the first input node;

a first end of the first storage capacitor is electrically connected to the first node, and a second end of the first storage capacitor is electrically connected to a second voltage terminal;

a control electrode of the on-off control transistor and a first electrode of the on-off control transistor are electrically connected to the first input node, and a second electrode of the on-off control transistor is electrically connected to the first node.

11. The gate driving unit according to claim 9, wherein the switch control sub-circuit comprises a switch control transistor;

a control electrode of the switch control transistor is electrically connected to the first input node, a first electrode of the switch control transistor is electrically connected to the input clock signal terminal, and a second electrode of the switch control transistor is electrically connected to the first control node.

12. The gate driving unit according to claim 1, wherein a polarity of the voltage signal of the first node is the same as a polarity of the voltage signal of the first input node.

13. The gate driving unit according to claim 1, wherein an absolute value of a voltage value of the voltage signal of the first node is greater than an absolute value of a voltage value of the voltage signal of the first input node.

14. The gate driving unit according to claim 1, further comprising a first node control circuit; wherein the first node control circuit is electrically connected to a second input node, a third voltage terminal and the first node, respectively, and is configured to write a third voltage signal inputted by the third voltage terminal into the first node under the control of a potential of the second input node.

15. The gate driving unit according to claim 14, wherein the first node control circuit comprises a first node control transistor;

a control electrode of the first node control transistor is electrically connected to the second input node, a first electrode of the first node control transistor is electrically connected to the third voltage terminal, and a second electrode of the first node control transistor is electrically connected to the first node.

16. The gate driving unit according to claim 1, further comprising a first energy storage circuit; wherein the first energy storage circuit is electrically connected to the second node and the second clock signal terminal respectively, and is configured to control a potential of the second node based on the second clock signal.

17. The gate driving unit according to claim 1, further comprising the gate driving signal output terminal and a first energy storage circuit; wherein the first energy storage circuit is electrically connected to a second node and the gate driving signal output terminal respectively, and is configured to control a potential of the second node according to a gate driving signal outputted by the gate driving signal output terminal.

18. The gate driving unit according to claim 1, wherein the output circuit is respectively electrically connected to the first node, a second node, the gate driving signal output terminal, the output voltage terminal and a second clock signal output terminal, and is configured to write an output voltage signal into the gate driving signal output terminal under the control of the potential of the first node, and control to write a second clock signal into the gate driving signal output terminal under the control of a potential of the second node;

the output voltage terminal is used for providing the output voltage signal.

19. A gate driving circuit, comprising a gate driving unit, wherein the gate driving unit includes a charge pump circuit and an output circuit; wherein the charge pump circuit is electrically connected to a first input node, an input clock signal terminal and a first node respectively, and the charge pump circuit is configured to control a voltage signal of the first input node under the control of an input clock signal provided by the input clock signal terminal, the voltage signal of the first input node is written into the first node when the voltage signal of the first input node is a first voltage signal; and the output circuit comprises a first output transistor, a control electrode of the first output transistor is electrically connected to the first node, and a first electrode of the first output transistor is electrically connected to an output voltage terminal, and a second electrode of the first output transistor is electrically connected to a gate driving signal output terminal.

20. A display device, comprising a gate driving circuit, wherein the gate driving circuit comprises a gate driving unit, and the gate driving unit comprises a charge pump circuit and an output circuit; wherein the charge pump circuit is electrically connected to a first input node, an input clock signal terminal and a first node respectively, and the charge pump circuit is configured to control a voltage signal of the first input node under the control of an input clock signal provided by the input clock signal terminal, the voltage signal of the first input node is written into the first node when the voltage signal of the first input node is a first voltage signal; and the output circuit comprises a first output transistor, a control electrode of the first output transistor is electrically connected to the first node, and a first electrode of the first output transistor is electrically connected to an output voltage terminal, and a second electrode of the first output transistor is electrically connected to a gate driving signal output terminal.

* * * * *